(12) United States Patent
Hansen et al.

(10) Patent No.: US 11,080,788 B2
(45) Date of Patent: Aug. 3, 2021

(54) METHOD FOR MACHINE-CONTROLLED LEGAL PORTFOLIO MONITORING

(71) Applicants: Peter K. Hansen, Stamford, CT (US); Lars Kragh, Stamford, CT (US)

(72) Inventors: Peter K. Hansen, Stamford, CT (US); Lars Kragh, Stamford, CT (US)

( * ) Notice: Subject to any disclaimer, the term of this patent is extended or adjusted under 35 U.S.C. 154(b) by 438 days.

(21) Appl. No.: 16/007,230

(22) Filed: Jun. 13, 2018

(65) Prior Publication Data
US 2018/0293659 A1 Oct. 11, 2018

Related U.S. Application Data

(62) Division of application No. 14/968,982, filed on Dec. 15, 2015, now abandoned.

(60) Provisional application No. 62/091,685, filed on Dec. 15, 2014.

(51) Int. Cl.
*G06Q 40/06* (2012.01)
*G06Q 50/18* (2012.01)

(52) U.S. Cl.
CPC ............ *G06Q 40/06* (2013.01); *G06Q 50/18* (2013.01)

(58) Field of Classification Search
None
See application file for complete search history.

(56) References Cited

U.S. PATENT DOCUMENTS

| 7,844,533 B2 | 11/2010 | Hamer et al. |
| 8,332,740 B2 | 12/2012 | Graham |
| 2002/0038233 A1 | 3/2002 | Shubov et al. |
| 2002/0091598 A1 | 7/2002 | Farkas |
| 2002/0156857 A1* | 10/2002 | Brewer ............... G06Q 40/04 709/206 |
| 2004/0205010 A1* | 10/2004 | Hamer ............... G06Q 40/00 705/35 |
| 2007/0282904 A1 | 12/2007 | Mitchell |
| 2008/0215474 A1 | 9/2008 | Graham |
| 2010/0153282 A1 | 6/2010 | Graham |
| 2010/0268605 A1* | 10/2010 | Waelbroeck ........ G06Q 40/06 705/14.53 |
| 2012/0047056 A1* | 2/2012 | Hamer ............... G06Q 40/06 705/35 |

OTHER PUBLICATIONS

Jessica Erickson, "Automating Securities Class Action Settlements", 72 Vand. L. Rev. 1817 (Year: 2019).*

* cited by examiner

*Primary Examiner* — David P Sharvin
(74) *Attorney, Agent, or Firm* — Ohlandt, Greeley, Ruggiero & Perle, L.L.P.

(57) ABSTRACT

There is a method for machine-controlled legal portfolio monitoring. The method has the following steps: a) obtaining securities transactional data from multiple financial firms for a system; b) processing the securities transactional data to calculate losses in the system; c) permitting law firms to view the losses in the system without revealing the identity of the multiple financial firms; d) permitting the law firms to submit to the system security litigation proposals to financial firms that have incurred losses; and e) allowing financial firms that have incurred losses to respond to the security litigation proposals by engaging directly with a particular law firm through the system. There is also a system. There is also a storage medium.

3 Claims, 25 Drawing Sheets

Customer specific normalizing mapping of security transaction

Loss Rule table

| Column | DataType | Sample value | 93106 | 93107 | 93108 | 105423 | 105424 | 105425 | 105426 | 96255 | 96256 | 96257 | 96258 |
|---|---|---|---|---|---|---|---|---|---|---|---|---|---|
| RULE_NUMBER | NUMBER | | | | | | | | | | | | |
| BUY_BEGIN | DATE | | 1/23/2008 | 1/23/2008 | 1/23/2008 | 7/12/2005 | 7/12/2005 | 7/12/2005 | 7/12/2005 | 7/17/2007 | 7/17/2007 | 7/17/2007 | 7/17/2007 |
| BUY_END | DATE | | 12/23/2008 | 12/23/2008 | 12/23/2008 | 12/21/2009 | 12/21/2009 | 12/21/2009 | 12/21/2009 | 3/6/2008 | 3/6/2008 | 3/6/2008 | 3/6/2008 |
| SELL_BEGIN | DATE | | 12/24/2008 | | 1/23/2008 | 4/12/2010 | | 12/21/2005 | 7/12/2005 | 7/19/2007 | 2/28/2008 | 3/6/2008 | |
| SELL_END | DATE | | 12/31/2050 | | 12/23/2008 | 12/31/2050 | | 4/11/2010 | 12/21/2009 | 2/27/2008 | 3/6/2008 | 3/7/2008 | |
| SECURITY_ID | VARCHAR2 (15 Byte) | | US635405AW30 | US635405AW30 | US635405AW30 | US5006921085 | US5006921085 | US5006921085 | US5006921085 | US552771088 | US552771088 | US552771088 | US552771088 |
| CASE_ID | NUMBER | | 11173 | 11173 | 11173 | 11059 | 11059 | 11059 | 11059 | 10619 | 10619 | 10619 | 10619 |
| FORMULA | VARCHAR2 (150 Byte) | | P->(S or 1) | P->(S or 1) | P-S | P-1 or 2 | P-1 or 2 | P-S or P-1(S) or P-1 or 2 | NOCLAIM | NOCLAIM | P-S or 1-S | P-1 or 2 | P-1 or 2 |
| AMOUNT_1 | NUMBER | | 92.375 | 92.375 | | 5.01 | 5.01 | 4.19 | | | 30 | 18.39 | 18.39 |
| AMOUNT_2 | NUMBER | | | | | 1.32 | 1.32 | 1.32 | | | | 11.61 | 11.61 |
| AMOUNT_3 | NUMBER | | | | | | | | | | | | |
| AMOUNT_4 | NUMBER | | | | | | | | | | | | |
| AMOUNT_5 | NUMBER | | | | | | | | | | | | |
| AMOUNT_6 | NUMBER | | | | | | | | | | | | |
| AMOUNT_7 | NUMBER | | | | | | | | | | | | |
| AMOUNT_8 | NUMBER | | | | | | | | | | | | |
| AMOUNT_9 | NUMBER | | | | | | | | | | | | |
| AMOUNT_10 | NUMBER | | | | | | | | | | | | |

Fig. 12

| Column | DataType | Sample values | | | | | |
|---|---|---|---|---|---|---|---|
| CASE_ID | NUMBER | 1073 | 1073 | 1073 | 1073 | 1073 | 1073 |
| CLOSE | NUMBER | | | | | | |
| INF_PRICE | NUMBER | 3.443 | 3.445 | 3.494 | 3.55 | | 3.634 |
| INF_TABLE | NUMBER | 1 | 1 | 1 | 1 | 1 | 1 |
| SYMBOL | VARCHAR2 (15 Byte) | BMG3921A1009 | BMG3921A1009 | BMG3921A1009 | BMG3921A1009 | BMG3921A1009 | BMG3921A1009 |
| VALUE_DATE | DATE | 3/2/1999 | 3/3/1999 | 3/4/1999 | 3/5/1999 | | 3/8/1999 |

| Litigation Parade | Portfolio Monitor Analysis |

⊕ Logo

| Security | Source | Amount | Action | Status |
|---|---|---|---|---|
| VTUS | Watchlist | 1 m | Filing | |
| IBM | Portfolio | 520k | Settlement | |
| MRK | Portfolio | .2.5m | Motion to Dismiss | |
| CWHL 2007-11 | Portfolio | 3.2m | Settlement | |
| VSI | Watchlist | None | Trade | |
| RBI | Portfolio | 600k | Priv Lit | |
| GE | Portfolio | 4.525m | Filing | |
| | | | | |
| | | | | |
| | | | | |

⊗ Close

Portfolio monitor/Case information 2900

FIG. 22

METHOD FOR MACHINE-CONTROLLED LEGAL PORTFOLIO MONITORING

CROSS-REFERENCE TO A RELATED APPLICATION

The present application claims priority from U.S. Provisional Patent Application 62/091,685, filed Dec. 15, 2014, the entirety of which is incorporated herein by reference.

BACKGROUND OF THE DISCLOSURE

1. Field of the Disclosure

The disclosure relates to a method for machine-controlled legal portfolio monitoring. The disclosure also relates to a system for machine-controlled legal portfolio monitoring. The disclosure further relates to a storage medium having a program module for machine-controlled legal portfolio monitoring.

2. Description of the Prior Art

Law firms and attorneys/lawyers currently seek out financial firms as potential litigation clients by engaging in a process referred to as legal portfolio monitoring. Legal portfolio monitoring has heretofore been a manual case-finding mechanism by which law firms, on an ongoing basis, individually monitor financial markets and news for market events that might correlate with provable financial losses in the portfolios of financial firms, e.g., financial institutions and individual investors, that might provide justification for litigation. Once provable financial losses have been identified and justified, the law firm then must approach the affected financial firm and present a proposal for litigation.

Law firms have faced many drawbacks in carrying out legal portfolio monitoring. A law firm has to locate and obtain historic transaction data from multiple financial firms with whom they have business relationships or connections. Further, a law firm typically does not have access to all of a financial firm's transaction histories and data nor do they have real-time access nor do they have access to all securities portfolios. A law firm may have access to historic or aged transaction data that may or may not be relevant or timely. A law firm may be forced to periodically download transaction histories and data. Further, the process of analyzing a financial portfolio from data can be costly and cumbersome for a law firm. Further, there can be an inherent conflict of interest when a law firm monitors a financial institution for the purpose of representing the financial firm. Further, a financial firm may be inundated with queries and solicitations from multiple law firms seeking to litigate the same issue. Further, the overall costs of carrying out legal portfolio monitoring can be high for a law firm and redundant when looking at legal-portfolio monitoring as an industry wide task in whole and in total.

Financial firms typically prefer to keep securities transaction histories and data confidential and not disclose it to law firms and other outside parties. Financial firms typically do not want to be identified in relation to their activities in the competitive financial marketplace. Mechanisms to limit or secure access are not present in conventional portfolio monitoring. Further, a financial firm may have to disclose information to multiple law firms to obtain proper monitoring of its transaction histories and data and receive competitive proposals for litigation for the full scope of litigation. Further, the process of transferring financial portfolio and historic transaction data can be costly and cumbersome. Further, there is an inherent conflict of interest when a law firm monitors an institution for the purpose of representing the financial firm. Further, a law firm may or may not choose or want to propose or carry out litigation on a particular matter, so a financial firm may be forced to interact with multiple law firms to obtain legal services in order to meet their fiduciary responsibilities. Further, a financial firm may be inundated with queries and solicitations from various providers. Further, the overall costs of carrying out legal portfolio monitoring can be high for a law firm and be either redundant or incomplete in looking at the securities industry as a whole.

It would be desirable to have a computer-controlled method for connecting financial firms and law firms for the purpose of legal portfolio monitoring. It would further be desirable to have a machine-controlled method and system which providers can be availed of extensive transaction histories and data for individual financial firm as well as totals or accumulations for groups of financial firms or for the entire industry. It would further be desirable to have a machine-controlled method and system in which legal portfolio costs can be minimized. It would further be desirable to have a computer-controlled method and system in which data security and confidentiality is maintained when a financial firm releases transactional data to multiple law firms, and that the identity of the financial firm remains confidential. It would further be desirable to have a method system in which the likelihood that a financial firm may be forced to interact with the sales process of multiple providers is minimized. It would further be desirable to obtain a more complete, neutral, efficient, and inclusive method of portfolio monitoring.

SUMMARY OF THE DISCLOSURE

According to the present disclosure, there is a method for machine-controlled legal portfolio monitoring. The method has the following steps: a) obtaining securities transactional data from multiple financial firms for a system; b) processing the securities transactional data to calculate losses in the system; c) permitting law firms to view the losses from the system without revealing the identity of the multiple financial firms; d) permitting the law firms to submit to the system security litigation proposals to financial firms that have incurred losses; and e) allowing financial firms that have incurred losses to respond to the security litigation proposals by engaging directly with a particular law firm through the system.

Further according to the present disclosure, there is a system for machine-controlled legal portfolio monitoring. The system has a processor and a memory that contains instructions that are readable by the processor and causes the processor to carry out the following: a) obtaining securities transactional data from multiple financial firms for a system; b) processing the securities transactional data to calculate losses in the system; c) permitting law firms to view the losses in the system without revealing the identity of the multiple financial firms; d) permitting the law firms to submit to the system security litigation proposals to financial firms that have incurred losses; and e) allowing financial firms that have incurred losses to respond to the security litigation proposals by engaging directly with a particular law firm through the system.

Further according to the present disclosure, there is a storage medium. The medium has a program module that contains instructions that are readable by a processor and cause the processor to carry out the following: a) obtaining securities transactional data from multiple financial firms for a system; b) processing the securities transactional data to calculate losses in the system; c) permitting law firms to view the losses in the system without revealing the identity of the multiple financial firms; d) permitting the law firms to submit to the system security litigation proposals to financial firms that have incurred losses; and e) allowing financial firms that have incurred losses to respond to the security litigation proposals by engaging directly with a particular law firm through the system.

DESCRIPTION OF THE FIGURES

For the purposes of illustrating the disclosure, there is shown in the drawings embodiments that are presently preferred. It should be understood, however, that the disclosure is not limited to the precise arrangements and instrumentalities shown.

FIG. 12 depicts an example of a table of loss rules used in the calculation and finding of damages.

FIG. 13 depicts an example of a price inflation table used in the calculation and finding of damages.

FIG. 22 depicts a schematic diagram and graphical interface depiction of a portfolio monitoring summary.

DETAILED DESCRIPTION OF THE DISCLOSURE

Figure 1:
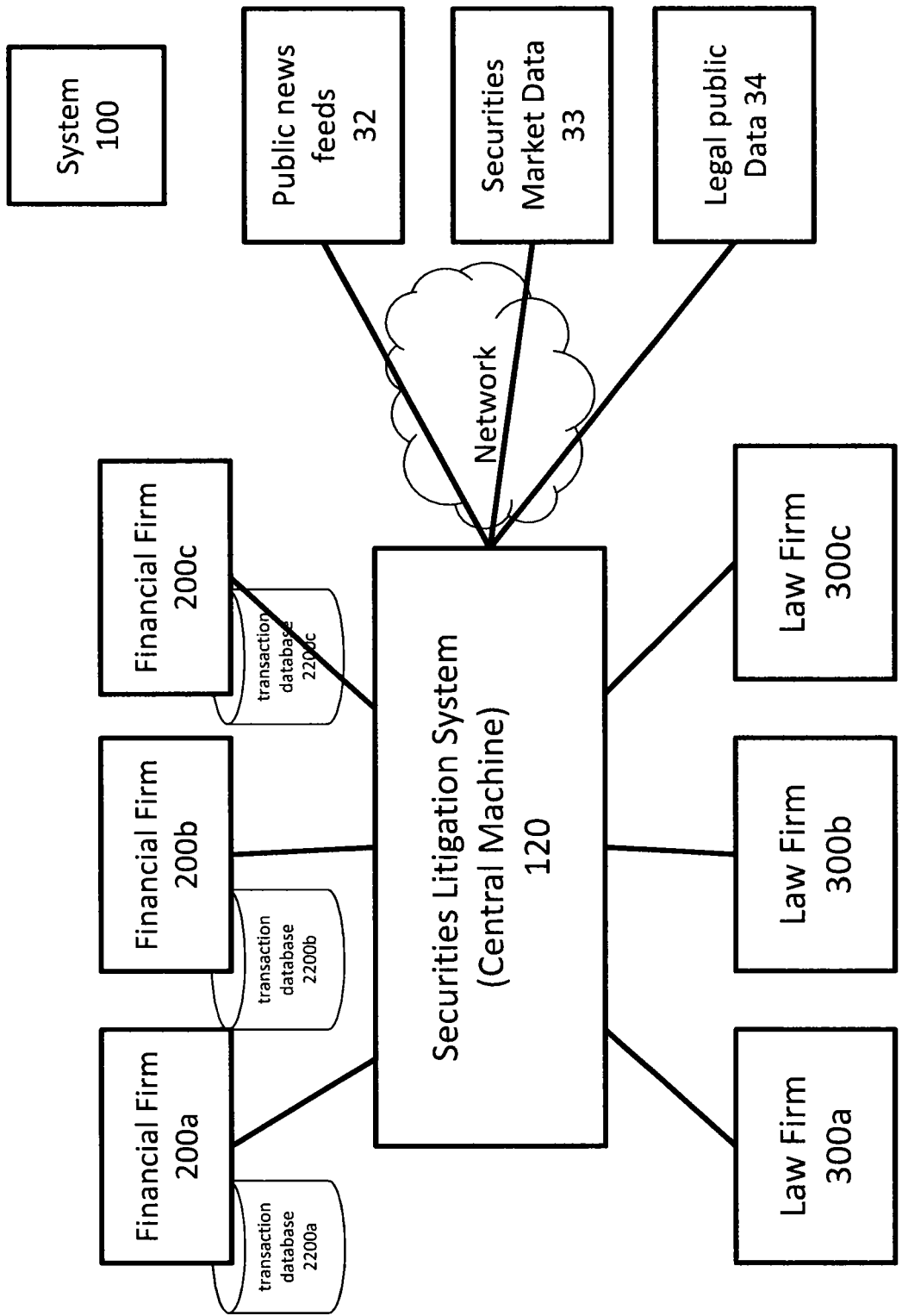
FIG. 1 depicts a schematic diagram of a central machine-controlled system and method according to the present disclosure for facilitating bidirectional communication flow between multiple law firms and multiple financial firms.

The present disclosure relates to a machine-controlled method and system for connecting financial firms that hold or trade securities and law firms for the purpose of initiating securities litigation within a real-time portfolio monitoring process based on loss experience. Uncertainty exists as to the location and amount of losses, which have been experienced by financial firms both in part and in total. The computer-driven system identifies losses that have been located within financial firms for the purpose of initiating securities litigation using generally applied portfolio monitoring methods. The present disclosure further relates to a computer for carrying out the method.

The disclosure relates to a computer-implemented and machine-controlled method and system for facilitating and securing communications between financial firms engaged in the transacting of financial securities and those law firms engaged in the promulgation of securities and securities class action litigation. The system identifies losses that have been located within financial firms for the purpose of initiating securities litigation using generally applied portfolio monitoring methods.

Some of the functional features of the method and system of the present disclosure include the following: (a) identifying potential money claims based on losses located at a specific financial institution(s); (b) aggregating the total loss experience across participating financial institutions relating to a particular security; (c) allowing the identification of losses on a repeated and iterative basis, based on industry-standard portfolio monitoring loss parameters, to prove and assure that the optimal loss experience has been obtained; (d) allowing each law firm to determine whether or not losses have been computed on an optimal basis for their needs to justify and support litigation; (e) replacing the forensic methods now used to assemble losses without knowing the financial institutions that have had actual loss experience; (f) limiting information flow from financial firms to law firms on an as-needed basis and until proposals and solicitations to litigate have been accepted to form an agreed-upon attorney client relationship to litigate a case; (g) protecting proprietary trading data that could be misused were it disclosed unnecessarily to third parties; (h) masking the identity of those firms having loss experiences; (i) allowing financial firms the ability to obtain the best possible representation; (j) allowing financial firms to meet their fiduciary responsibility to optimally recover losses through litigation; (k) allowing law firms obtaining clients that might otherwise not be readily accessible; (I) allowing law firms the ability to differentiate themselves from each other as part of the sales process; (m) allowing law firms to argue and prove in legal proceedings that they represent sufficient losses and financial-firm clients either in private or class actions; (n) replacing forensic loss calculations for total market damage, such as price inflation and other forms of loss damage estimation, with an actually computed loss calculation; and (o) providing a more complete view of all securities litigation to financial firms so they no longer are dependent on conflicted patchwork monitoring efforts.

The method and system of the present disclosure afford numerous advantages over conventional legal portfolio management systems. Law firms can be availed of more extensive transaction histories and data from financial firms. Financial firms can restrict the use of their data while at the same time obtaining a complete and independent view of the portfolio monitoring landscape.

The machine-controlled system interfaces with real-time transactional data so that it can process and aggregate actual losses experienced across multiple financial firms, time frames, and securities. The system also has the capability of processing data sets that are heterogeneous across legal and financial business sectors. The system is also interactive and provides enhanced communication capability and timeliness. The system also provides enhanced data security and confidentiality such that a financial firm can release transactional data to a server (also referred to herein as a machine) for anonymous access by multiple prospective law firms without revealing actual transactions. The system reduces detail in transactional data and masks a financial firm's identity until such time as the individual financial firm has chosen a specific law firm to represent them and has expressly agreed to release confidential transactional data and the firm's identity. The system also provides a financial firm the option of maintaining confidential transactional data within its control by allowing the system to access data via an application program interface (API).

The machine-controlled system allows the financial firm to interact and disclose confidential transactional data directly to multiple prospective law firms. Law firms can at the same time calculate losses experienced by participating financial firms. The system allows the portfolio monitoring to take place without direct release of an individual financial firm's confidential transactional data. A financial firm can have the system release of detailed data and information only if there is a benefit.

The machine-controlled system also allows participating financials firm to interact electronically in an anonymous or direct way with multiple prospective law firms thereby increasing competition between providers to obtain their business. This means that the machine-controlled system provides a consolidated portfolio monitoring process by making the activities of multiple law firms available to the participating financial firms.

The machine-controlled system allows law firms to transmit their identity and credentials along with litigation proposals they believe will result in profitable litigation the financial institutions. For class action lawsuits, the system allows for prompt and accurate identification of potential lead plaintiff financial firms, i.e., those whose transactions have incurred the greatest losses. Particular financial firms can then be availed of the legal and procedural advantages of being a lead plaintiff.

The machine-controlled system allows law firms to adjust and continually refine case construction parameters with respect to pricing and timeframe.

The machine-controlled system reverses the current mechanics of the litigation sales process, and, hence, also the conduct and performance of the resulting portfolio monitoring service. Through this machine-controlled system, financial firms effectively control the process that law firms currently use for the primary purpose of generating sales. With the computer-driven and machine-controlled method, financial firms can pick and choose lawsuits and litigators based on the needs of the financial firms and avail themselves to competition among law firms.

Definitions

Anonymous Masking—a process to obfuscate proprietary information and identity.

Applications program interface (API)—a snippet of computer code that can be used to access a database as a program function.

Calculation Algorithm—a set of rules and calculations implemented in a software process to review transaction data as to compute losses incurred based on certain case construction parameters.

Case Construction (Process/Parameters)—the fine-tuning of damage calculations based on loss experience summed across multiple financial institutions. In the historic portfolio monitoring methodology, the super-set of losses are estimated with the financial firms that experienced actual losses incurred to be later identified as part of a sales process. The system of the present disclosure provides a factual representational of the losses as allocated in part and in total across participating financial firms in real-time. Security identifier, date range, and accounting method (LIFO/FIFO) are integrally standard parameters of legal portfolio monitoring.

Central Machine—a server or server farm containing centralized processes and databases for the aggregation of law firm, financial firm, lawsuit, data feed, and internet data records. The machine facilitates communication between litigators and financial firms. The communication process is neutral and allows financial firms to see all securities litigation and litigators that are relevant to their portfolio positions and loss experiences. The communications process allows law firms to have insight into the sum of other aggregated values, including all loss experiences across participating financial institutions. The central machine allows law firms to aggregate losses across multiple financial firms and to initiate securities litigation on behalf of multiple financial institutions.

Chain of custody—a series of procedural steps tightly controlling the tracking and transfer of electronic data.

Communications Process—an intermediary process that facilitates bidirectional information flow between financial institutions and law firms. As needed, the communication process leverages an anonymous masking process by which financial positions are presented to law firms in such a way as to protect the proprietary nature of transaction data and firm identity. The process addresses a major concern on the part of financial institutions that want to be assured that their transactional data and identity will not be disclosed to others. The communication process also allows law firms to communicate their best representation of a lawsuit that has been optimized to cumulative loss experiences of financial institutions along with their business networking information. Law firms are hoping that the financial firms will elect to use them on a case, at which point the financial firm will disclose and thus unmask their transaction data identity.

Financial firm—a business enterprise that engages in the holding, turn over, or trading of exchange-listed or quoted securities either for itself or others.

Interface or Graphical Interface—a process in memory on displayed on a computer screen for the entry or reading of electronic data also stored in memory.

ISIN—"International Securities Identification Number" identifies a unique security. Its structure is defined in ISO 6166. Securities for which ISINs are issued include bonds, commercial paper, stocks and warrants. The ISIN code is a 12-character alpha-numerical code that does not contain information characterizing financial instruments but serves for uniform identification of a security at trading and settlement.

Law firm—a provider that provides securities litigation services. The provider can be a law firm, a group of lawyers or attorneys, or an individual lawyer or attorney or a proxy (reporting the actions of a physical law firm). The provider may be a public or private entity or person. A law firm may also be referred to herein as "legal counsel" or "counsel".

Law Firm Database—contains information about both law firms and specific lawyers within law firms that are engaged in securities litigation. Law firms that participate in the system have the ability to enter business networking and case information directly into this database.

Law Firm Machine—provides a platform and a front end user interface for law firms to enter case and business networking data. This machine also contains anonymous feeds from participating financial institutions. The law firm machine allows litigators to enter and adjust rules and parameters that drive calculations across financial institutions for the purpose of optimizing securities class action cases. Law firms have a picture of the sum of all financial losses that would not be available without the system of the present disclosure. The ability to parameter-tune the sum of loss data so that it is optimized to a date range is also a preferred aspect of the disclosure. (Law firm and law firm machine are used interchangeably).

Loss experience—the actual amount that has been lost by a financial firm in the buying and selling of securities for a particular security within a specific time frame and using a specific accounting method.

Loss Rule—The machine-controlled system takes all given purchases and sales and makes transactional pairings according to the accounting methodology selected for a case, i.e., FIFO or LIFO. Pairing transactions allows the system to determine when purchases were sold and shorts sales were covered by a purchase. To achieve the task of assigning loss calculations to each pair, the system uses a rule-based formula system wherein discrete rules are used. The system applies these rules to transactional pairs and multiplies the result by the quantity of any matching pair, storing the result until all pairs have been analyzed for a given transaction set.

News Feeds, Market Data Feeds—information sources that are sold by third parties containing information about price action or news relating to securities.

Normalized Data (Normalization)—Data that has been procedurally standardized for use in a common system. Each financial firm stores transaction data in proprietary formats thus requiring standardization for use within a common system.

Ownership (of losses, of financial transaction data, and of financial firm identity-name)—financial institutions consider their trade experiences found within their transaction portfolio databases to be of proprietary nature.

Price Inflation/Loss Damage Estimation—a model for the estimation of losses. The difference of the actual market value of a security at a point in time versus the theoretical price level of the same security had all information been known (materialization of concealed risk in the calculation of damages, efficient market theory in the calculation of damages).

Program module (snippet)—a software routine containing lines of code to accomplish a sub-task of a larger software program or project.

Proposal for Litigation (Litigation Proposal)—A set of hard criteria such as actual losses incurred and soft criteria such as advantages a lawyer or law firm might have in representing a client in a case. Information supporting the sale of legal services for the purpose of matching a legal counsel to a potential client.

Search Plan—a list of sites and sources that could yield positive results in the identification of externally generated class action litigation. For example, a single source called D&O Diary http://www.dandodiary.com/ speaks to concerns relating to director and officer's insurance for class action litigation and may have information relating to new litigation. The search plan contains many sources, including Yahoo® and Google®. Search plans leverage the law firm and security databases as well as key search terms.

Search Process—is on ongoing process on the machine that searches for litigation. The search process looks for case formation data from law firms and securities. The process would also search for large deviations in price as a trigger event for each security in a securities list.

Securities—any tradeable contract or financial product that can be purchased and sold or transferred between counterparties, including, but not limited to, exchange traded financial instruments, such as stocks; bonds; options; warrants; convertible instruments; derivatives contracts, and all types of financials instrument identified by a standardized number or listed in or quoted on a domestic or foreign exchange or financial market.

Securities Cases—litigation and potential litigation focused on the recovery of losses from the holding of tradeable securities.

Security of Interest—a financial security that has had price action or a news event to suggest that it is a prospect for follow-on litigation.

Securities Litigation Management—policies and procedures used by firms to organize and control the flow of litigation from inception to completion.

Securities Portfolio Transaction Data (Transaction Database)—Financial firms store a chronological and auditable log of their activities as they buy and sell securities on behalf of themselves and/or their customers.

Storage medium—a physical disk drive or similar persistent medium containing electronic records.

Shared Network/Common Network—a group of computers belonging to independent counterparties that can interoperate electronically through communications hardware, systems, and protocols. Security systems and intentional limitations in information flow would ideally be a subcomponent of a shared network.

An embodiment of a system of the present disclosure is shown in FIG. 1 and is generally depicted by the numeral 100. FIG. 1 depicts an overview of bidirectional communication flow in which multiple law firms and financial firms are connected for the purpose of establishing bidirectional communications through the system. System 100 has a central machine 120 that accesses transactional data from transactional databases 2200a, 2200b, and 2200c from financial institutions 200a, 200b, and 200c, respectively and concurrently, via an application program interface (API) (not shown), in which transactional portfolio data is retained confidentially and security at each of financial institution 200a, 200b, and 200c. Law firms 300a, 300b, and 300c are in communication with central machine 100 and have access to identified market losses of transactional data from financial firms 200a, 200b, and 200c. Central machine also obtains data from a public news feed 32, a private securities market data 33, and a public legal data feed 34, which are received from non-participating third parties (not shown). Law firms 300a, 300b, and 300c are in communication with central machine 100 for the purpose of helping to identifying market losses among financial institutions 200a, 200b, and 200c without the disclosure of the actual identifying information of the financial institution itself. In this manner, loss experience can be disclosed in a summary format, while the identity of the financial firms and the proprietary transactional portfolio detail can be protected. The central machine, financial firms, and law firms connect within the context of a portfolio-monitoring network in which they all have agreed to participate (participating financial firms, participating law firms). The central machine has connectivity to outside feeds as necessary for the purpose of obtaining a complete view of litigation and financial market activity.

Figure 2:
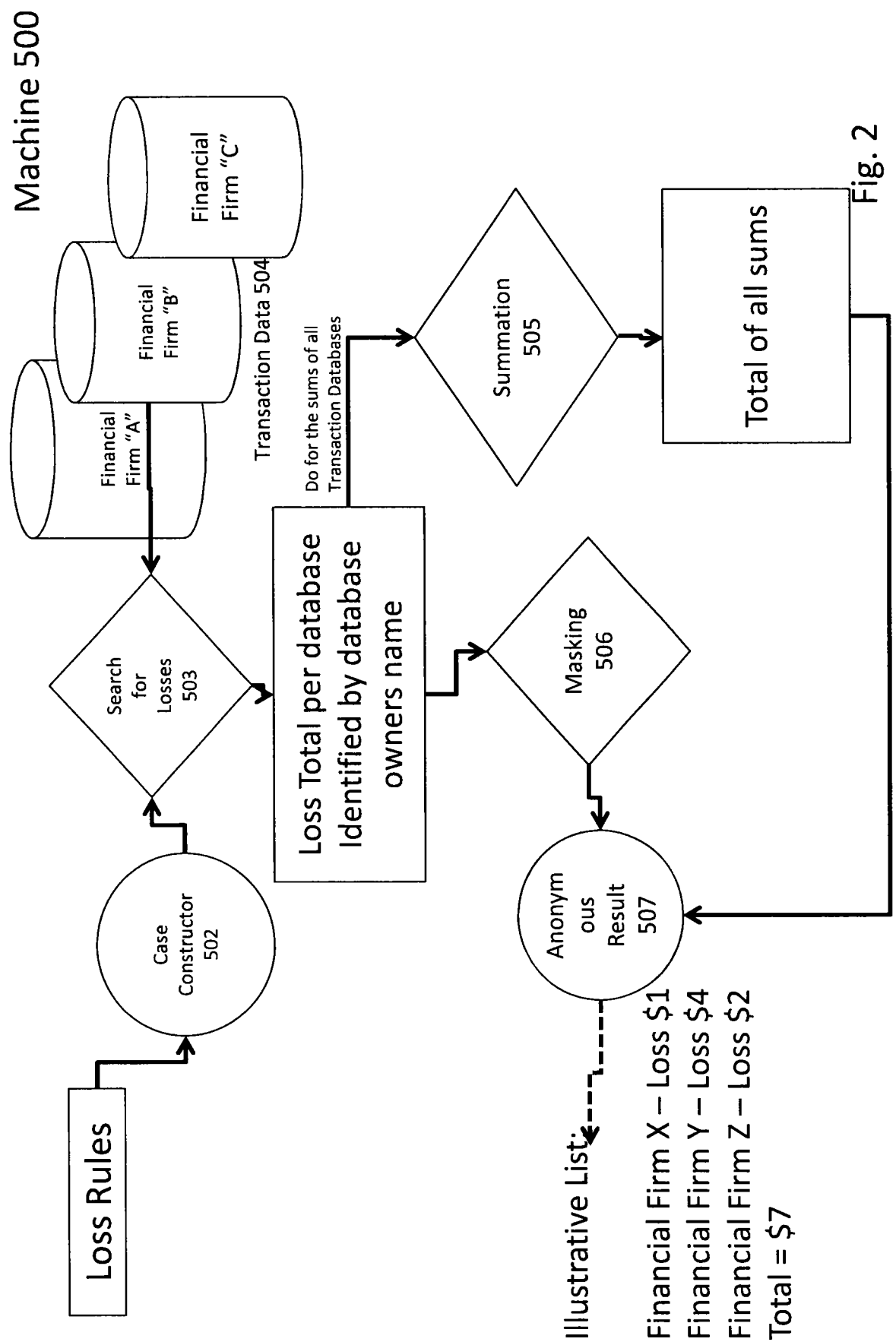
FIG. 2 depicts a schematic diagram of logical elements of the system and method of FIG. 1 showing a real-time portfolio monitoring process based on loss experience.

The logical elements of a central machine are set forth in FIG. 2 and are generally referenced by the number 500. Central machine 500 connects financial firms that hold or trade securities and law firms for the purpose of initiating securities litigation within a real-time portfolio monitoring process based on loss experience. Machine 500 has a process in memory to accept "loss rule" inputs in a case constructing process 502 from a law firm. The inputs consist of one or more loss rules containing a security identifier, formula and date ranges. A law firm would input parameters that correspond to a security case of interest that might warrant follow-on litigation.

Machine 500 has a process (program) in a memory 503 within then autonomously executes a search for financial firm(s) portfolio losses by calculating the differences between buys and sells using the date stamped chronology, of, and within, one or many transaction database(s) 504 of confidential transactional data and records belonging to and owned by a (or respective) financial firm(s) resulting in a summation of losses according to the loss rules that was selected during case construction 502. These calculations repeat for each individual database of all participating financial firms be it one or many law firms. An example of a loss rules database is listed on FIG. 12.

FIG. 2 embodies as illustrative example of a monitoring process. The process 503 found and computed $1 of losses for a financial firm A, $4 (four dollars) of losses for a financial firm B, and $2 (two dollars) of losses for a financial firm C. The losses found would be based on the loss rules and pertain only to the security identifier entered in 502 and would be a function of the date range entered in 502 as that range was compared to the time stamped chronology of buy and sell entries contained within the portfolio transaction databases that were examined. There could be one or many databases, and with this diagram illustrating the presence of three databases each being attributable to a distinct financial firm. The result would be a list of one to many sums each identified by a name corresponding to the name of the financial firm owning the data that was examined. A process (program) in a memory 506 masks the identity of the database owner(s) as loss information gets presented back as a list of losses corresponding to a masked-name or a proxy-name. The financial firm name A becomes masked as financial firm X. In this case, financial firms A, B and C have been re-named X, Y, and Z.

Based on how many databases are present, the process will be repeated as a process in a memory 505 sums the results of in total for presentation. A sum total has no identification as to ownership and therefore does not need to be masked to protect confidentiality. A list has been presented in this diagram illustrating how the entering of loss rules corresponds to a masked output of losses discovered for each financial firm that was examined and a summary total for the same. A law firm could repeat the process as needed, but with different parameters, until such time as they could present a proposal for litigation that has been ideally tuned to loss experiences in part and in whole.

Figure 3:
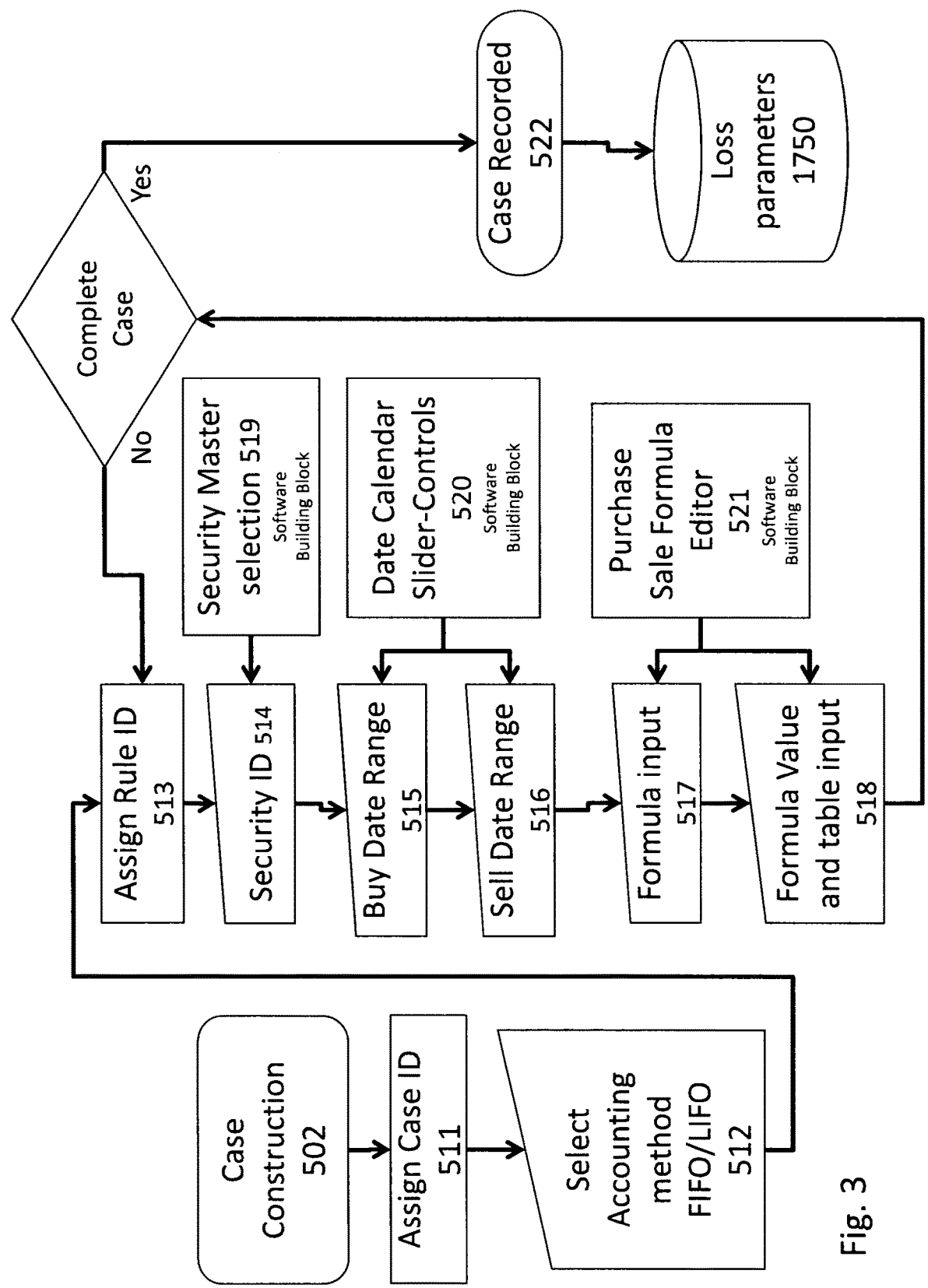
FIG. 3 depicts a schematic diagram of software handling of user inputs in a case constructing process for the system and method of FIG. 1.

FIG. 3 depicts the software handling of the user inputs as part of case constructing process 502 and is illustrated by a series of programming elements and parameters. Case constructing process 502 leverages software building blocks, including graphical user interfaces, algorithms, and code routine. A graphical user interface, residing at a law firm would at a minimum collect security identifier 519, a date range 520, and an accounting method 512 using graphical controls and sliders to accept the same.

A process in memory (program) on machine subsequently stores the case and loss rules (loss parameters) in a systems database 1750. A case ID 511 is assigned by the system and the user can select an accounting principal for calculation of loss 512. One or more calculation rules can be entered for the case. Each rule will be assigned a Rule ID 513 and number by the system. A Security ID 514 can be outright entered or selected from a list of securities stored in the system presented by the user interface 519. Securities reference tables are stored in the system from a securities master source (note shown). A purchase date range and a sell date range, beginning and end, can be entered to describe the specific loss rule (515, 516, and 520). Dates can be entered by any known method, such as via a simple entry line "mm/dd/yyyy" or via graphical monthly calendar's from which a day can be picked via point-and-click. Further a loss calculation formula will be picked or constructed using a formula input 517 and formula editor 521. Formulas can be broken down first by whether or not they cover trading rules when securities are both bought and sold or holdings rules when securities are held through relevant class period dates. From there, rules can be broken down into comparisons between purchases and sales, comparisons between either purchases and sales and relevant inflation figures, or comparisons between the results of either of the previous comparisons. Trade based rules is a broad categorization of rules where something was both bought and sold. One of the most common rules used is P-S. The definition of this rule is purchase price minus sale price. For any transactional pair that meets the security identifier, purchase date and sale date range for a rule in the loss table for a given case, the system takes the purchase price and subtracts the sale price and multiplies the result by the quantity of shares of the transactional pair.

Reference values and price inflation tables can be added as these may be referenced in the formula (formula value and table input 518, purchase sale formula editor 521). Individual values (1,2,3 . . . ) and inflation table values referenced the formula can be set by entering the applicable numbers via the interface editor 521. Rules can be entered until the desired number of rules is in place and stored in the system at cases recorded 522. As an example, a formula can use a price inflation table that could look like the following: "I(P)–I(S)". The definition of this rule would be the price of inflation on the date of purchase minus the price of inflation on the date of sale. The system achieves this by finding matching pairs, comparing the purchase date to a stored table of inflated prices for a case, assigning the inflated price given for that security, doing the same for the sale date, subtracting the purchase date inflation price found by the sale date inflated price found and multiplying the result by the quantity for the pair. Another use of a price inflation table would be as a factor of price. An example would be "PI-SI". As with I(P)–I(S), the inflated price table is used alongside the purchase dates and sale dates, but in this scenario the formula is defined to multiple the purchase price by the price of inflation given for the date of purchase, and that amount is subtracted by the sales price multiplied by the price of inflation on the date of sale.

In addition, a case can use condition rules where combinations of rule outcomes are compared and the lesser (or greater) result is used as the answer to how much loss is given to a transactional pair that meets the criteria for that rule. An example would be: "P-S or I(P)–I(S)". This commonly used rule compares the result of P-S to the result of I(P)–I(S)—both defined above—and whichever result yields the smaller amount is multiplied by the quantity.

Share holdings can also be subject to loss calculation. Holding rules are applied when purchase transactions have no matching sale transactional pair, as a purchase was never sold before the class period ended. The same holds true for sale transactions that do not have a matching purchases, resulting in short sales that are left uncovered. In the vast majority of class action cases, there will be a rule (90 Day PSLRA Look-Back Average Closing Price) or part of a rule where the 90 day look-back closing average of the security is used for calculating losses. Typically this closing average price is subtracted from the purchase price to get a value for held shares at the end of the class period. For short balances, it is typical that no loss is given.

One of the most common holding rules would be "P–1". It compares the price of purchase to the amount given in a column titled AMOUNT_1, and the value in that column is most typically the 90 Day Look-back Average Closing price. It is calculated on shares purchased and not sold until after the given date—usually the end of the class period—or never sold.

These formulas can be re-used any time there is overlap in the rule methodology in an old case to a new case. Layout and examples of the loss rules and inflation tables are shown in FIG. 12.

Figure 4:
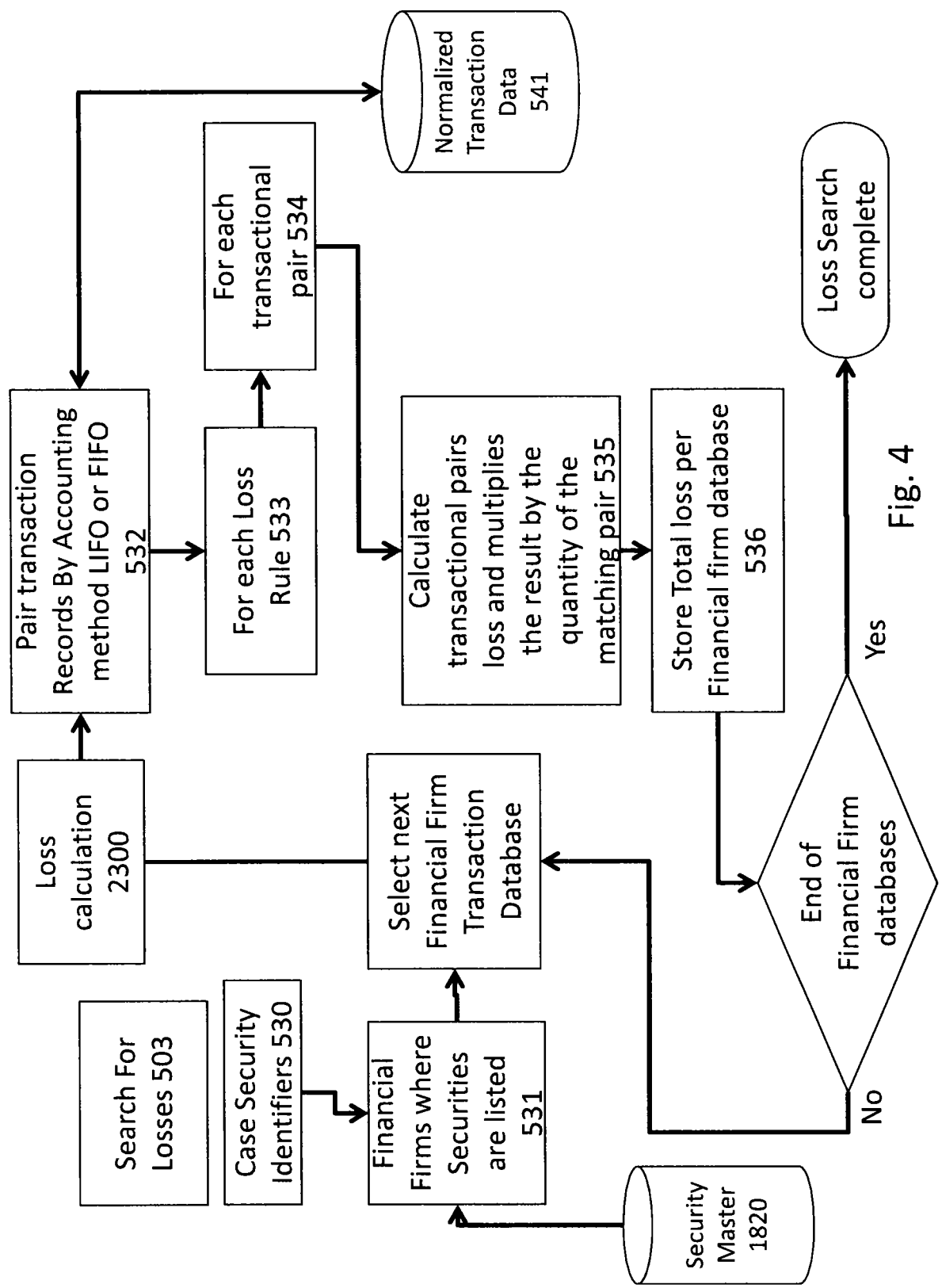
FIG. 4 depicts a schematic diagram of software handling of user inputs as part of a search for losses for the system and method of FIG. 1.

FIG. 4 depicts the software handling of inputs as part of a machine-controlled search and calculation for losses process as illustrated by a series of programming elements and parameters applied to achieve the logical function described as a search for losses process 503. All transaction data sets 541 corresponding to securities named in the case are processed to find losses. Financial firms whose securities identifiers match the securities in the case to be processed are identified (531) in a security master database 1820. For each financial firm identified to have activity in the securities associated with the case the normalized transaction data 541 (see FIG. 5) is opened for processing. The system takes all given purchases and sales and makes transactional pairings according to the accounting methodology selected for a case I.e. FIFO or LIFO 532. Pairing transactions allows the system to determine when purchases were sold and shorts sales were covered by a purchase. To achieve the task of assigning loss calculations to each pair, the system uses a rule-based formula system whereby discrete rules are used in process 533. The system applies these rules to transactional pairs in process 534 and multiplies the result by the quantity of any matching pair in process 535 and stores the result until all pairs have been analyzed for a given transaction set in process 536.

Figure 5:
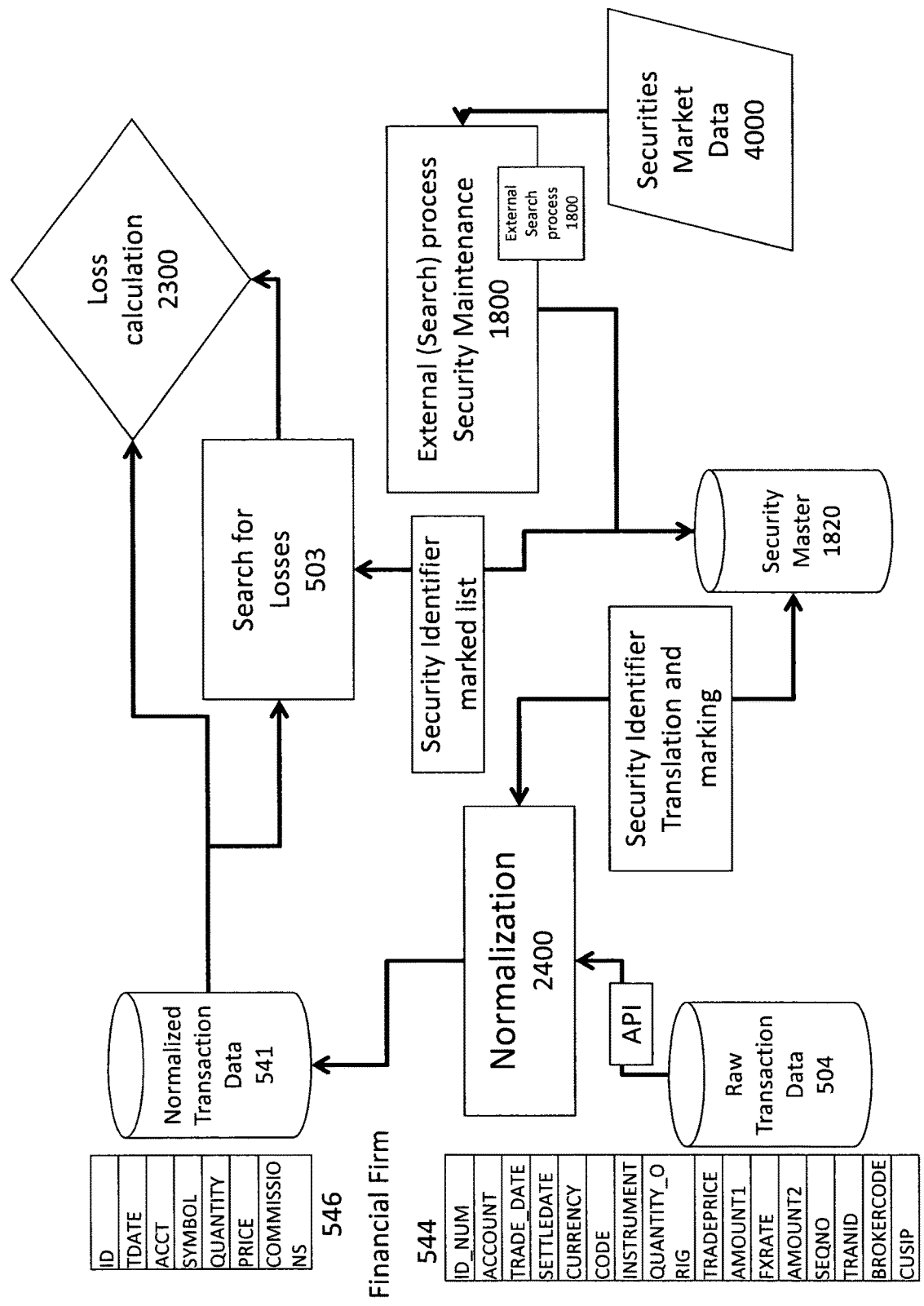
FIG. 5 depicts a schematic diagram of normalization of financial firm portfolio transactional data for the system and method of FIG. 1.

FIG. 5 depicts normalization of financial firm portfolio transactional data. In the present disclosure, current transactions are subject to data normalization rather than dated historic transactions conventionally employed in the prior art. Use of current transactions ensures a complete up-to-date view of the transactions for legal portfolio monitoring. In this manner, a law firm can analyze a legal event the day after it has occurred. Timeliness also a major advantage to law firms in the finding of losses, the construction of cases, and formulation of a filing to meet limited deadlines. Timeliness also a major advantage to financial firms because the legal portfolio monitoring system is consolidated and timely completed with feedback from multiple law firms compared to conventional systems. An example of disparate and normalized data is disclosed in FIG. 12.

Normalization of data is necessary as independently operated financial firms configure their transaction data in different formats for interchange and/or distribution. As illustrated in FIG. 5, raw transaction data 504 is converted into normalized data 541, a standardized format compatible with the loss search process in memory 503. FIG. 5 sets forth a record format 544 of examples of types of raw transaction data. FIG. 5 also sets forth a record format 546 of examples of types of normalized transaction data.

A normalization process 2400 standardizes data, as needed, to a usable format for use in follow-on processes of search for losses in process 503 and loss calculation in the process 2300. Normalization of financial firm specific transaction data is accomplished by explicit mapping of field values in their data records to the normalized field format. Conversion of data elements may have to take place to get a data type needed for the normalized format, such as a date type conversion from plain text. A security identifier will have to be converted to the specific type as required like ISIN to ensure uniformity in the normalized records. To accomplish this translation, a systems security master database 1820 is used to look up a specific security identifier for a financial firm. This process also marks these securities in systems security master database 1820 as being present in the financial firm's transactions to speed up subsequent loss searches by the process of process 503. Security master database 1820 is updated periodically from external sources 4000 by an external maintenance search process 1800.

Figure 6:
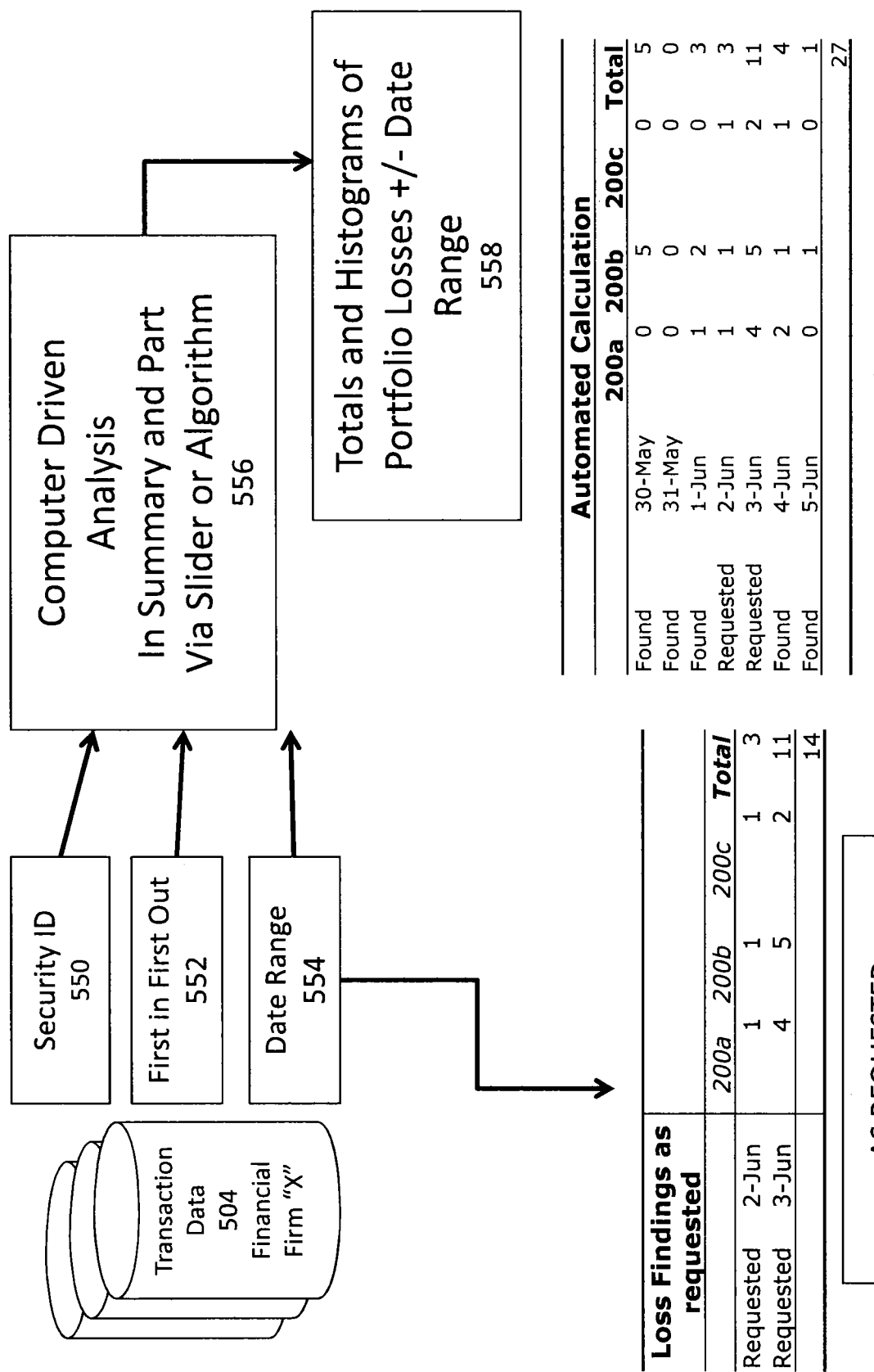
FIG. 6 depicts a schematic diagram of an iterative process facilitating discovery of an optimal result for the system and method of FIG. 1.

FIG. 6 depicts an example of an iterative process for facilitating discovery of an optimal result. FIG. 6 shows that a clearly defined, explicit, and declarative input into the machine drives the calculation and follows on presentation of several results that are specific to each database examined in part and as totaled in summation and illustrated by several histograms. The result of interests in legal portfolio monitoring, being the total amount of losses experienced by financial firms relating to a specific security, can be derived with the input of a date, accounting method (FIFO/LIFO) and security identifier.

In FIG. 6, a litigator requests that the system provide calculations based on the inputs of a case construction process 502 consisting of a security identifier of interest 550, accounting method 552, and an explicit date range 554. The litigator selects an explicit date range of interest narrowly spanning two specific days, e.g., June 2 and June 3. The system would use these inputs as a starting point for the finding of losses via computer-driven analysis 556. The system would examine a date range wider than was requested and then report back both what was requested and also an algorithmic interpretation of what would be mathematically optimal. The system compiles and reports totals and histograms of portfolio losses +/− date range in process 558. The requested result is illustrated by the finding of $14 in losses. Alternately, the automatic calculation found $27 in total losses through the finding of an outlier $5 in losses on May 30. The litigator would need to make a human judgment as to whether or not he had the causal justification to construct a proposal on the expanded date range.

Currently, law firms rely on models because no human facility exists that has the capability to find actual losses contained in the data, as described in the above example, residing within the proprietary transaction databases distributed across disparate financial firms.

The computer-driven process and system could expand the examined date range beyond what was requested via an input and toggle LIFO and FIFO accounting methods for use as binary alternates for the calculation of losses. The computer can expand date range either through the application of code instructions within an algorithm or through user manipulation of a series of "sliders." A "slider" is a non-proprietary graphical control with which a user may set a value by moving an indicator, typically in a horizontal fashion. The computer-driven process and system could use either an algorithm or a slider with the examination of data and presentation of findings yielding the same result.

For simplification purposes, FIG. 2 illustrates a resultant list while FIG. 6 illustrates resultant histogram range of results with the core logical elements being the same.

Figure 7:
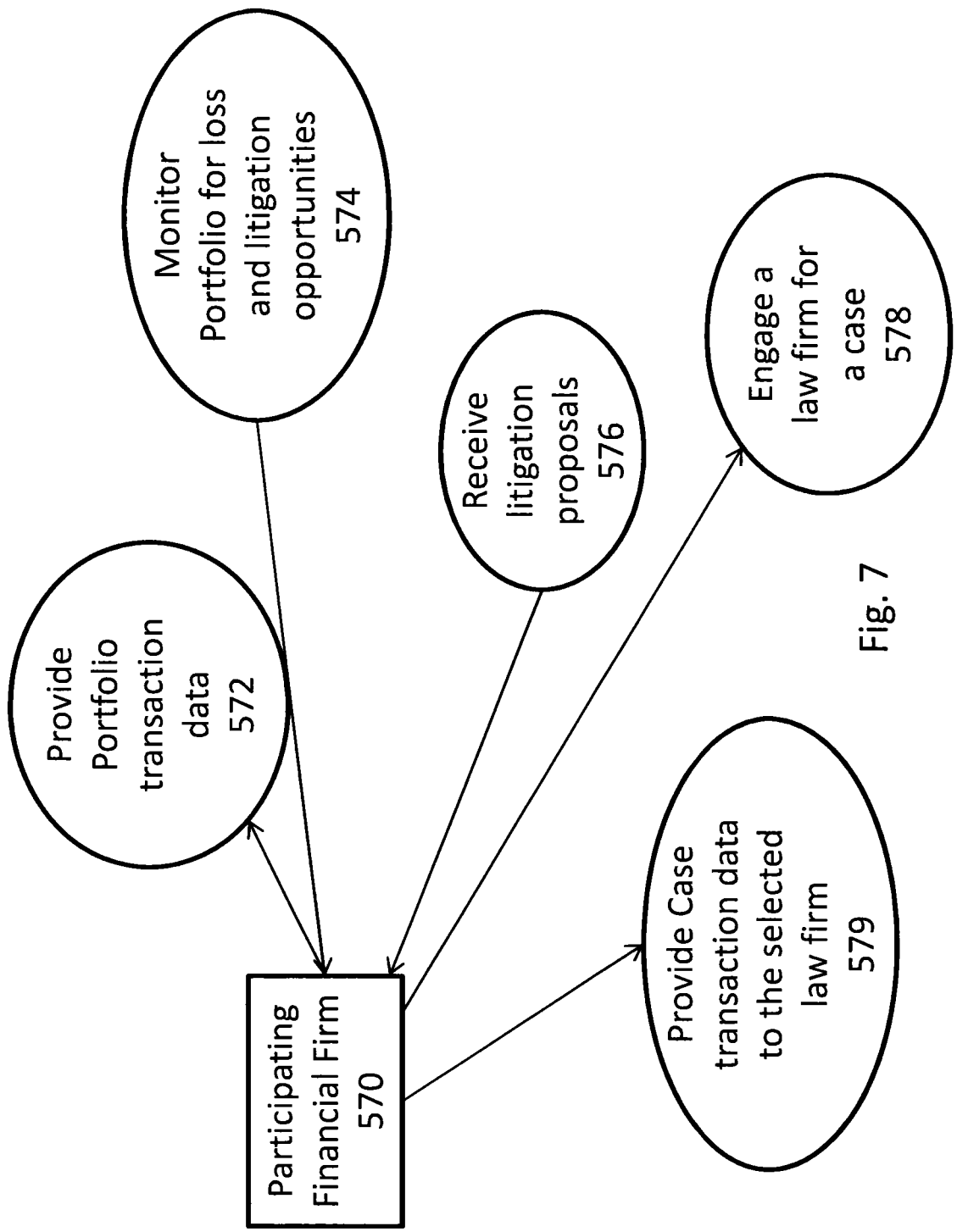
FIG. 7 depicts a schematic diagram outlining the roles and interactions of a financial firm illustrated as a use case for the system and method of FIG. 1.

FIG. 7 outlining the roles and interactions of a financial firm illustrating a use case for the system and method of the present disclosure. The use case demonstrates what information the computer-driven method exchanges with a participating financial firm 570. The use case has the following method steps: In step 572, financial firm 570 automatically and transparently provides a summarized and masked representation of portfolio transaction data (and the financial firm's identity) on an anonymous, restricted, and secured basis. In step 574, financial firm 574 receives portfolio-monitoring services from those participating law firms who have identified loss experience and litigation opportunities relevant to their portfolio transactional data. In step 576, financial firm 570 thereafter receives litigation proposals from a variety of law firms that have monitored its portfolio transactional data. In step 578, financial firm 570 can then engage one (or more) legal providers as counsel for the prosecution of a case. In step 579, financial firm 570, as a requisite for litigation, releases the details of their identity and unmasked details of their transactional portfolio data to the selected law firm(s).

Figure 8:
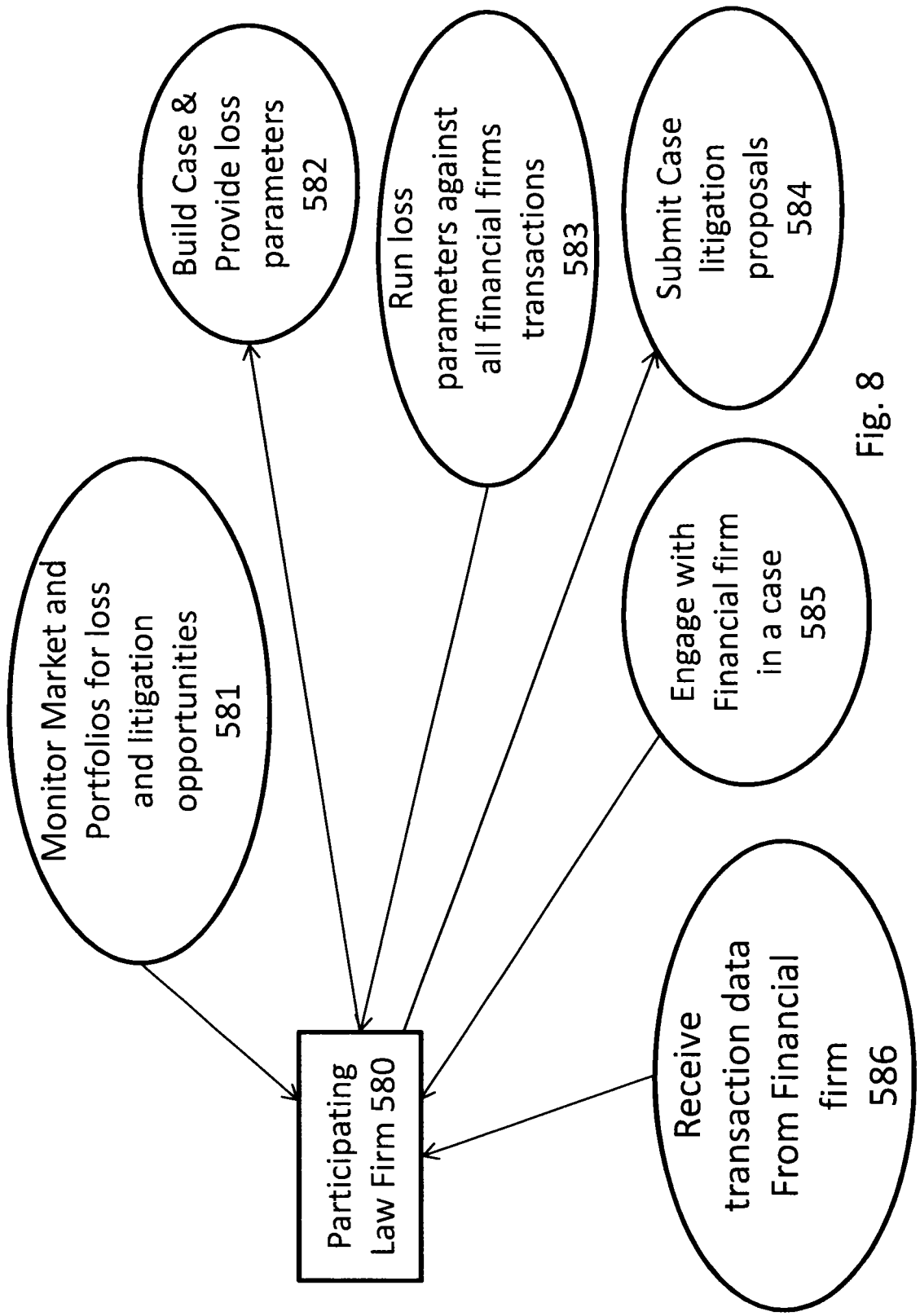
FIG. 8 depicts a schematic diagram outlining the roles and interactions of a law firm illustrated as a use case for the system and method of FIG. 1.

FIG. 8 outlines the roles and interactions of a law firm illustrating as a use case for the system and method of the present disclosure. The use case demonstrates what information the computer-driven method exchanges with a participating law firm 580. The use case has the following method steps: In step 581, participating law firms broadly and independently monitor financial markets, and, specifically through the method, monitor the anonymous transaction data automatically received from the system on behalf of participating financial firms for litigation opportunities. In step 582, participating law firms provide tunable loss parameters to the system through an interface. In step 583, participating law firms order the system to conduct repeated and iterative calculations of actual loss experience within all transactional portfolio data of all participating financial firms based on tunable loss parameters. In step 584, participating law firms can use the system to submit litigation proposals to those firms with identified loss experiences. In step 585, participating law firms will be engaged through the acceptance of a litigation proposal by a financial firm. In step 586, participating law firms will receive the unmasked identity of that financial firm as well as the details of transactional portfolio data relevant to the accepted case proposal.

Figure 9:
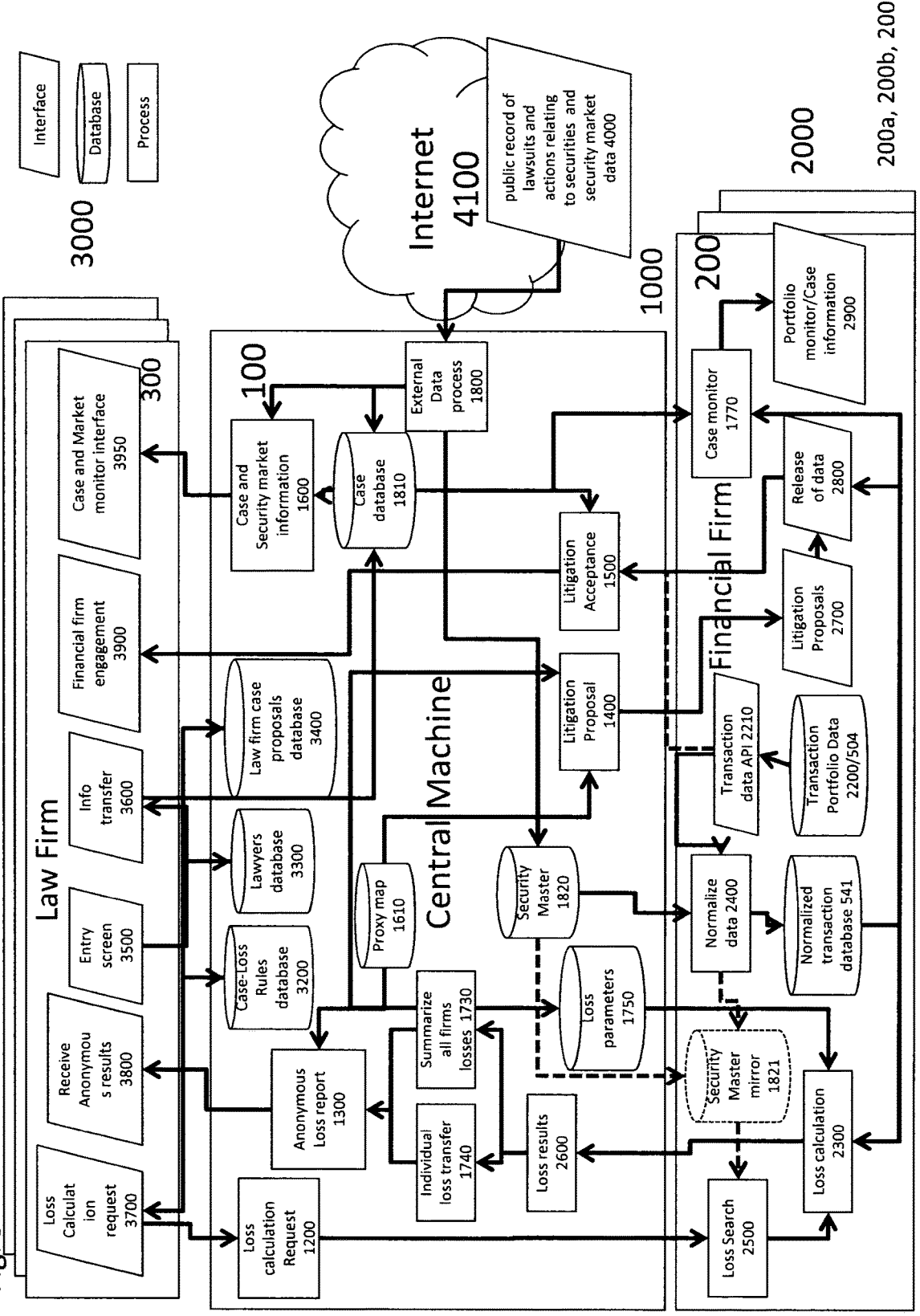
FIG. 9 depicts a schematic diagram illustrating the connectivity between a law firm, a financial firm, and central machine for the system and method of FIG. 1.

FIG. 9 illustrates the physical connectivity between elements within the method as organized as a network of participating counterparties using both physical and logical components. FIG. 9 further illustrates in step by step detail how the central machine described in FIG. 1 would most likely be implement interfaces, centralized processes, distributed processes, memories, and databases. FIG. 9 further illustrates an overview of how the computerized methodology would operate as a whole in a distributed network having numerous law firms and financial firms with a central computer executing centralized communication and computational functions. The networked system in FIG. 9 represents the physical and logical elements that would have to be deployed to accomplish financial data segregation to an individual financial firm and execute the method shown in FIG. 1.

The computerized method as described as a distributed system. Law firms enter information into an interface 3500 in memory on machine 300 (law firm 300 and law firm machine 300 have been used interchangeably) to populate databases 3200, 3300, and 3400.

An interface 3500 allows database 3200 to be populated with a list of securities and loss rules in connection with case design and modeling process 502 (FIG. 2) that a law firm currently is or has an interest in litigating. Database 3200 will contain a series of case loss rules that at a minimum will consist of a security identifier, a date, and an accounting method.

Interface 3500 allows database 3300 to become populated with the name and the profile of each lawyer within the firm. The profile can contain any information relating to the individual lawyer including resume or picture. Interface 3500 allows database 3400 to become populated with proposal information and documents as to why the law firm would be best suited to prosecute a case when compared to other law firms.

An interface 3950 provides a case and market monitor that allows law firms to see historical securities market data and known cases sourced from external sources 4000 or internally from participating law firms 3000. Interface 3950 is driven from a process 1600 that provides case data and documents from a case database 1810 and historical security market data from an external data process 1800. Interface 3950 presents historical market data and news so a law firm can identify market conditions that can be a ground for litigation.

Law firms can proceed to identify losses through the formalized process with multiple financial firms that the machine-controlled system of the disclosure facilitates. The system also facilitates the proprietary needs of financial firms to keep their identity and transaction detail masked and protected until they have agreed to proceed with litigation.

A law firm initiates a search for losses that pertain to an individual security, found in database 3200 residing on machine 100 (FIG. 1) through an interface 3700 residing in memory on a machine 300 (an illustrative law firm). Using this interface, a law firm can tune parameters relevant to case construction (case construction process). As described in FIGS. 1, 3 and 4, parameters that are essential to legal portfolio monitoring consist of security identifier, a date range of interest, and first in/first out accounting methods.

Interface 3700 on machine 300 connects across the network to process 1200 residing in memory on central machine 100. Sub-system 1200 resides in memory on central machine 100 for the purpose of receiving computation requests and loss calculation requests from the networks 300a, 300b, and 300c of participating law firm(s).

Sub-system 1200 is a process in memory of central machine 100 that communicates across the network to machines of financial firms that participate in networks (machines) 200a, 200b, and 200c in FIG. 1 (communicating from one to many).

Financial firm machines 200a, 200b, and 200c (and all others on the network) have the loss search process in a memory 2500 that listens for and receives communications from central machine 100 running a loss calculation request process in memory 1200 derived from and communicated by central machine 100. Loss search process 2500 takes the computational request for the security of interest that law firm 300 originally entered in interface 3700 and forwards that request to a loss calculation process 2300 to see if any of the securities of interest exists in financial firm database 1821. In order to keep a financial firm's security transactions private and segregated, the security master mirror database 1821 is located at the financial firm's site and secured by them. Database 1821 is a copy of the security master database 1820 that contains only those security identifiers that the financial firm recorded within its proprietary and a secure portfolio transactions database 2200. A process 2300 (FIG. 3) residing in memory on machines 200a, 200b, and 200c and all other financial firms in the network. Sub-system 2300 calculates losses on the security of interest by searching transactional data 5041 located at each firm (FIG. 5).

Because each financial firm has its own proprietary format to store transactional data, process 2300 will call and use an intermediary process, which has been programmed in a bespoke manner and residing in memory 2400 at a financial firm 200 to convert to the "normalized format" used by the network as a whole. The security master database 1821 providing correlation between the process spawned by the loss calculation request and the call to a transactional data API 504. The call to normalize data 2400 would therefore be an intermediary process. FIG. 3 lists typical fields of a transactional database of a financial firm 504, which would need to be organized by a normalization process either with explicit data field mapping or through a heuristic algorithm to accomplish the same. In this way, and via a machine driven chain of custody, the proprietary data from each financial firm has been converted to a standard format so it can be managed and used by machine 100, and, therefore, as a result all law firms that participle in the network. This conversion process occurs across financial firms 200a, 200b, and 200c concurrently.

A process 2600 residing in memory of financial firm 200 (and all other financial firms concurrently) communicates computational results back across the network to a process 1720 residing in memory at the central machine 100 for the purpose of receiving computational results from any and all financial firms 200a, 200b, and 200c.

Sub-system 2600 sends received data to a process 1740 residing in memory at central machine 100. Sub-system 1740 takes the identity of the financial firm(s) and then applies a proxy mask stored in a database 1600 on machine 100 to anonymize the identity of each and every financial firm. The transaction detail for each firm has been hidden previously when it was summarized by process 2300 residing in memory at each financial firm. For example, the masking process would identify the name of a well-known bank with an anonymous mask or name such as "Bank 1" for presentation to a later law firm interface 3800 residing in memory at law firm machine 300 that had made the original request for computational results using an interface 3700.

Concurrently, a process 1730 keeps a summary total of the amount of losses found in the network of financial firms 200a, 200b, and 200c. An anonymous loss report process 1300 would retain in memory the individual loss transfer 1740 from each of the financial firm and the summaries of all firms' losses in total in process 1730 with the follow on transmission of the same to an interface 3800 of law firm 300.

Therefore, process 1300 residing in memory at the central machine 100 receives masked identities and summed losses (e.g. Bank 1–$2M, Mutual Fund 2–$3M, Sovereign Fund 1–$1M) of all the financial firms 200a, 200b, and 200c that had losses in their transaction databases 2200 (located at each financial firm 200a, 200b, and 200c) relevant to the original request made by interface 3700 of law firm machine 300. Sub-system 1300 also takes the total of losses ($6M) for transmission to interface 3800 located on machine 300.

The process from request via interface 3700 and result on interface 3800 on machine 300 provides law firms a way to construct cases based on aggregated losses. This case constructing process allows each law firm 300a, 300b, and 300c to search for losses in order to fine-tune cases on an iterative basis. Iterations are repeated using human intervention and judgment whereby a lawyer would enter a loss calculation request 3700, and the series of steps that have been described would be presented back with the receipt of an anonymous result 3800.

Losses may or may not justify litigation or the proposal of lawsuits. The system and method has allowed law firm 300 to know on a numerical basis whether or not actual loss experiences justify legal action. FIG. 6 illustrates the derivation of loss solutions specific to each individual financial firm database examined and in total. The central machine could be instructed to provide summaries across date ranges in wider ranges beyond those that were explicitly requested through the loss calculation request.

Once law firm 300 has constructed a case via the case constructing process, law firm 300 can then propose that case to one or many financial firms 200a, 200b, and 200c. Law firms propose litigation to potential clients using an interface 3600 that resides in memory on machine 300.

Interface 3600 residing in memory on machine 300 allows the law firm to present a package of information to financial firms containing a presentation of the business at advantages as to why and how the lawyer-law firm would best represent a potential client based on loss experiences discovered in fact by the loss calculation request. The law firm can select one or more unknown financial firms 200a, 200b, and 200c for the purpose of proposing litigation having actual insight into loss experience in part and in total.

Interface 3600 residing in memory on machine 300 communicates proposed litigation (including information about the firm, case and litigator) over the network to a process in memory 1400 residing on the central machine 100. Subsystem 1400 manages litigation proposals from all participating law firms 300a, 300b, and 300c.

Central machine 100 has a record of the actual identity of network participants stored in a proxy map database 1610, but the participating law and financial firms do not. A financial firm can receive several proposals to litigate from many law firms 300a, 300b, and 300c, each of which might present qualitative and quantitative advantages as part of their proposals. Using interface 2700, a financial firm 200 can accept a proposal and authorize the release of detailed transactional data relevant to the case and financial firm identity along with permission to litigate by using an interface 2800 located in memory on machine 200. Interface 2800 sends information to process for a litigation acceptance 1500 located on memory on central machine 100. Subsystem 1500 on central machine 100 transmits the released detailed information across the network to an interface 3900 residing on machine 300 that allows the law firm to receive accepted proposals. The case information initially established by participating law firms through the entry of proposals 3600 contributes the records found within case database 1810 residing on central machine 100. Case database 1810 is used by process 1500 to deliver only a subset of a financial firm's raw transaction data via an API 2210 or normalized transactions from database 5041 to the law firm via interface 3900.

The system accrues all comprehensive details and documentation of actionable securities litigation cases in the case database 1810. In parallel to the system's own law firm participants and processes, central system machine 100 continually searches public legal sources, and other paid sources, for securities cases being pursued by non-system participants. Process 1800 on central machine 100 searches external sources according to a search plan for inclusion within case database 1810. Information within cases database 1810 flows to litigations through process 1600 to be reported to them on the case information interface. In this way, law firms obtain insight into cases that they might not have otherwise been aware of.

Concurrently, interface 2900 can be used by financial firms to monitor its portfolio. A case monitor process 1770 obtains case information recorded into case database 1810 that is paired up with their security transactions in a database 5041. This is effectively a legal portfolio monitoring application.

Figure 10:
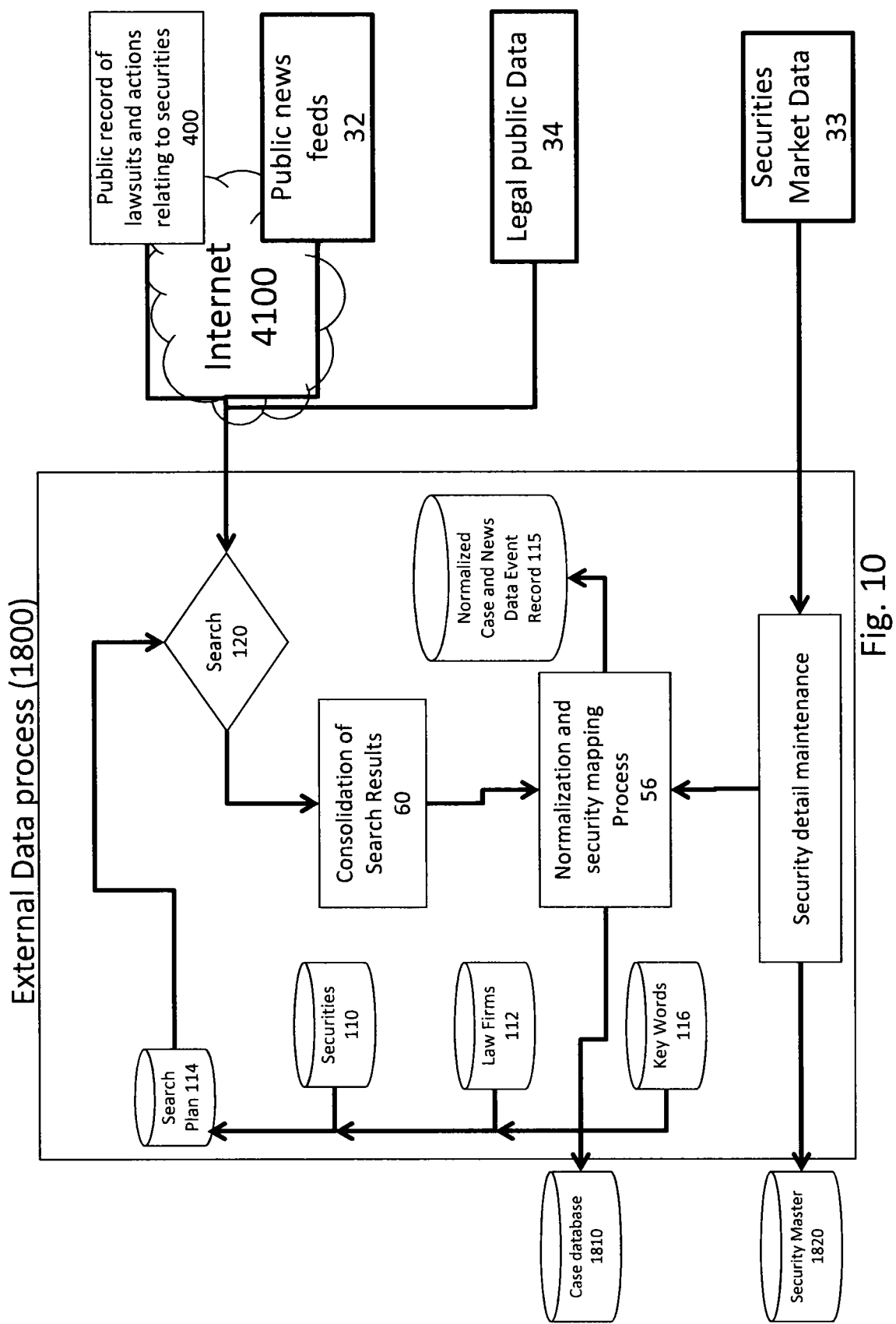
FIG. 10 depicts a schematic diagram illustrating optional access to external information for the system and method of FIG. 1.

FIG. 10 shows an optional external data system or process 1800 for access to external information accessible as part of a software implementation. Process 1800 employs data handling techniques that are commonly applied systems that use the internet as a database 400. Process 1800 allows external lawsuit case formation data, litigants, and law firms to be included in the system for portfolio monitoring even if they do not participate directly in the network. Process 1800 ensures the completeness of legal portfolio monitoring by providing a total picture of all known security litigations. Referring to FIG. 10, records on internet 4100, which are public records 400 or transmitted over the internet or private networks over paid public data feed 32 and paid legal public data 34, will be searched by a process in memory 120 on central machine 100 (FIG. 1) according to a search plan 114 consisting of a list of securities 110, law firm names 112, and key words 116. The search results will be consolidated via process in memory 60 and then they will be normalized to the data format used by the network by a conversion process 56 for storage for use in a database containing case data event records 115. Process 1800 also updates the systems security master 1820 with new information from a market data feed 33. Newly listed, delisted securities and related security ID's are recorded in security master 1820.

Figure 11:
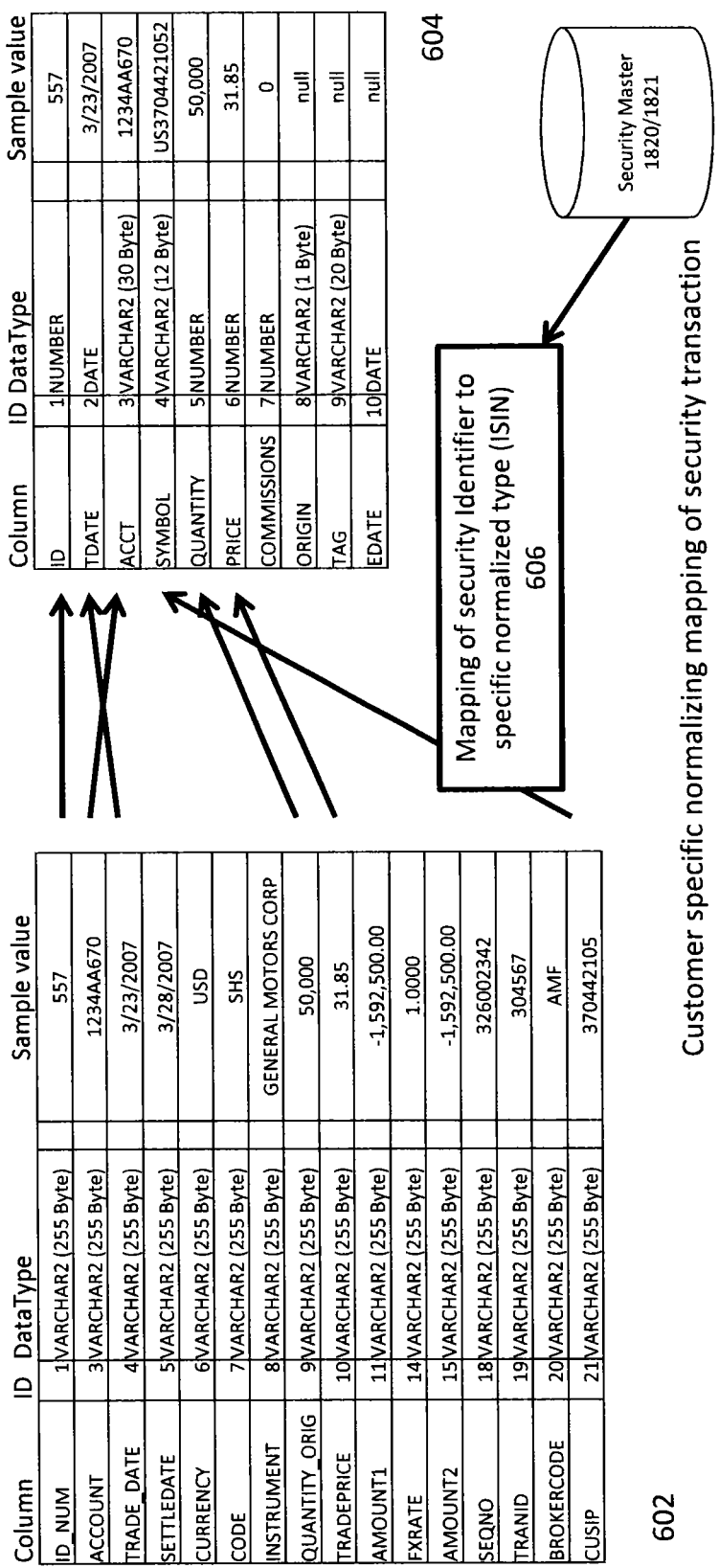
FIG. 11 depicts an example of a database table on a central machine in a normalized database and a corresponding record within a proprietary database in a participating financial firm.

FIG. 11 shows an example of a database table on a central machine in a normalized database and a corresponding record within a proprietary database in a participating financial firm. An example of a proprietary security transaction format is shown as table 602. An example of a normalized security transaction format is shown as table 604. Security master 1820 and 1821 employ mapping software to correlate a security identifier to a normalized type (ISIN) (606).

FIG. 12 shows an example of a table of loss rules used in the calculation and finding of damages. FIG. 13 shows an example of a price inflation table used in the calculation and finding of damages.

Loss Rule Examples

Example: P-1 or 2

Frequently, a cap or "maximum value" will be placed on the amount of loss allowed for a given transactional pair. In this formula, the lesser of the purchase price minus the value in the column AMOUNT_1 or the value in the column AMOUNT_2 is the resulting plan loss figure for a transactional pair that matches the security ID and date range of a rule with this formula.

Section 11 or Offering Rule Formulas

Cases which involve securities that were offered either initially (IPO) or in a secondary offering during the class period or as the main argument by plaintiffs in the case will get rules that require a purchase was made on such an offering.

Example: P=1, 2, P-S

This formula states that if the purchase price equals the value in AMOUNT_1 for this rule (likely because it was done at the offering price in the purchase period range for the rule), the loss attributed to the quantity in the matching transactional pair is the value in the AMOUNT_2 field of the rule. If the price is not equal to the value in the AMOUNT_1 field of the rule (likely because it was not done at the offering price), the loss is calculated by subtracting the sale price from the purchase price.

Special Scenarios

Example: NOCLAIM

This is the most commonly used rule in the system. Many cases spell out which sets of transactional pairs will not be used to calculate losses. The System gives a loss value of 0 when the NOCLAIM formula is given.

Example: P>1, P-1 or 2, NOCLAIM

This formula calculates as follows: if the purchase price is greater than the value given in the AMOUNT_1 field, the loss attributed to the quantity in the transactional match is the lesser of the purchase price minus the value in the AMOUNT_1 field or the value in the AMOUNT_2 field. Otherwise the transactional pair results in a loss value of 0.

Example: LIQ1

This is an example of a formula that does not in itself describe the mechanisms for calculating a loss figure as most other formulas do and shows the flexibility of the system. This formula takes 4 tiers of purchase prices into account and gives individual loss calculation scenarios for each tier, and is used in one settlement only.

Example: P=1,1-S or 2-i3(SI),i1(P1) or P-3

Here is an example of a formula in which multiple strategies are employed. In this offering type formula, for purchases done on the offering, losses are calculated as the lesser of the following:
a. The value in AMOUNT_1 minus the sale price, and
b. The value in AMOUNT_2 minus the inflated price value found for the sale date that has an INF_TABLE field value of 3 (three) multiplied by the sales price.

For those purchases not done on the offering during the same purchase period, loss is calculated as the lesser of the following:
a. The inflated price value found for the purchase date with an INF_TABLE field value of 1 multiplied by the purchase price, and
b. The purchase price minus the value in the AMOUNT_3 field.

Figure 14:
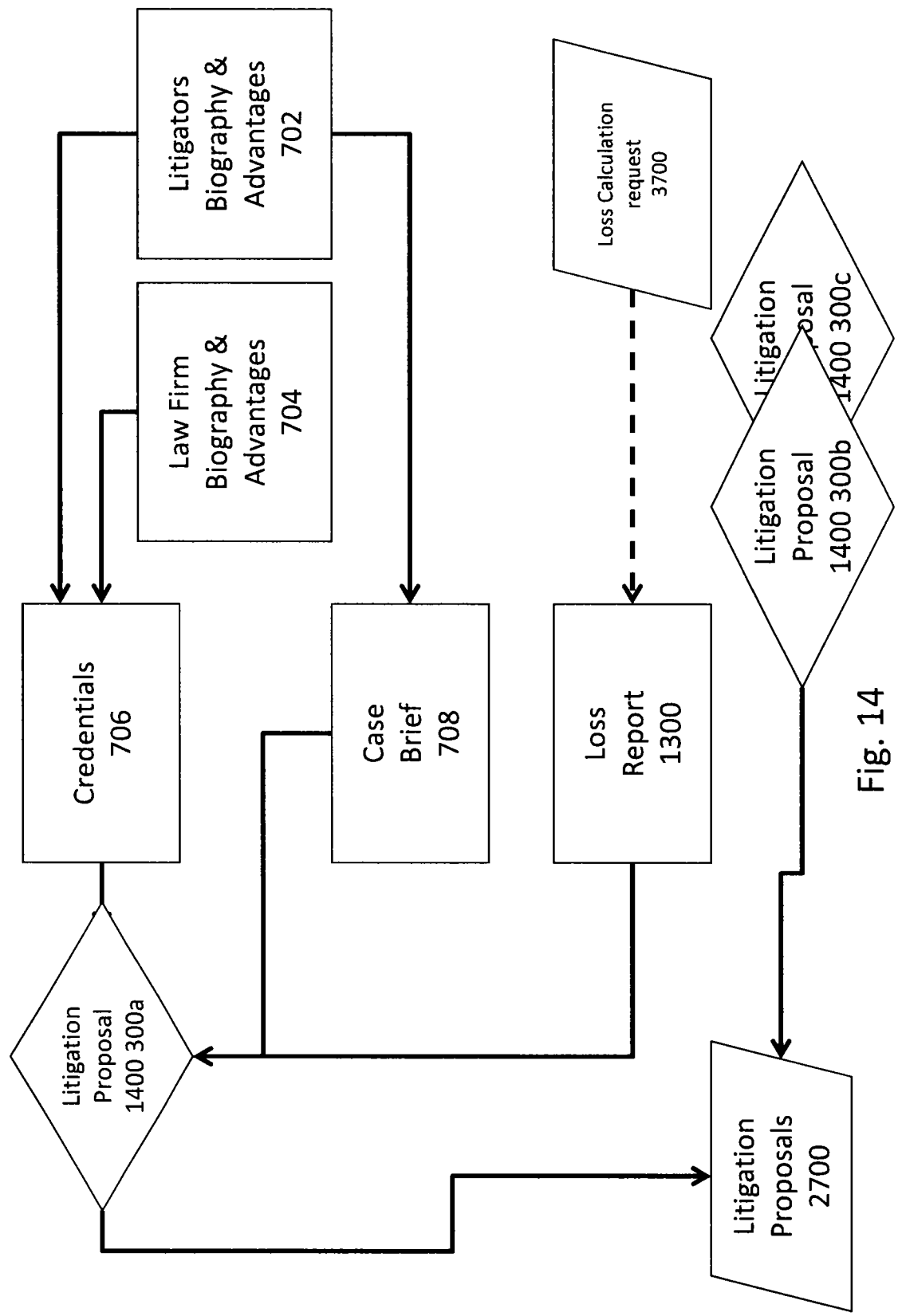
FIG. 14 depicts of an example of a use case in which a financial firm receives a litigation proposal from a participating law firm.
Figure 15:
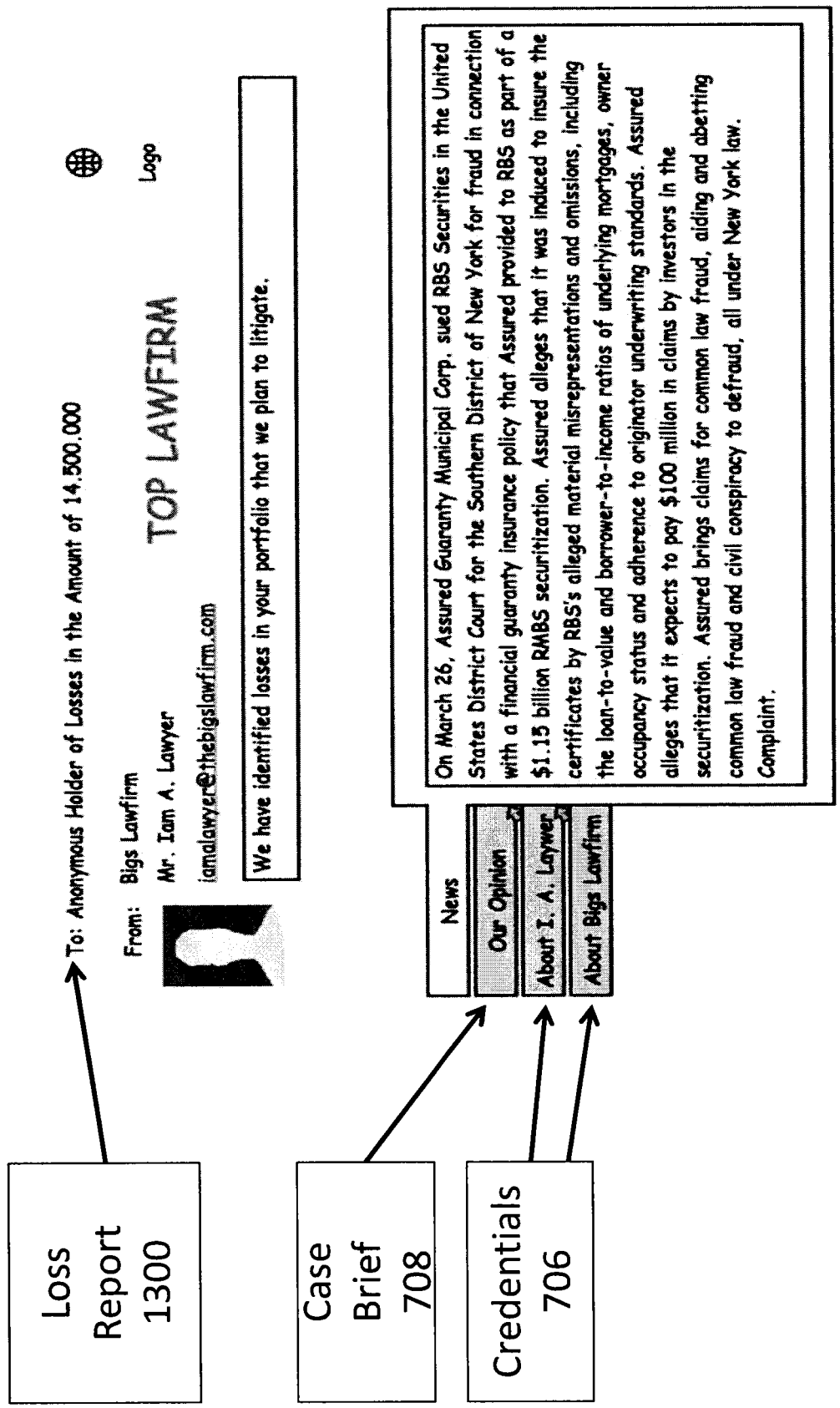
FIG. 15 depicts a schematic diagram and graphical interface depiction of an illustrative litigation proposal.

FIG. 14 shows an example of a use case in which a financial firm receives a litigation proposal from a participating law firm. Law firm 300*a* puts together a litigation proposal 1400 based upon information pertaining to litigator biography and advantages 702 and law firm biography and advantages 704, which collectively make up credentials 706. Proposal 140 is further based on information or data in loss report 1300 obtained as a result of loan calculation request 3700. FIG. 15 shows a graphical interface depiction of litigation proposal 1400 from FIG. 14.

A litigation proposal presents an argument as to why a particular law firm would best represent a financial firm in a securities litigation case. The argument consisting of biographical information about the law firm and the litigators within that firm, advantages as to why the firm and lawyers proposed would be best suited the case, a case brief being a short analysis of the case outlining to the financial firm legal opinions and viewpoints as to why and how they have been damaged and will recover, and loss calculations discovered, analyzed, and tuned. Financial firms may receive one or many litigation proposals relating to a particular case with competing proposals not only being different from a qualitative standpoint but also from a quantitative standpoint.

Figure 16:
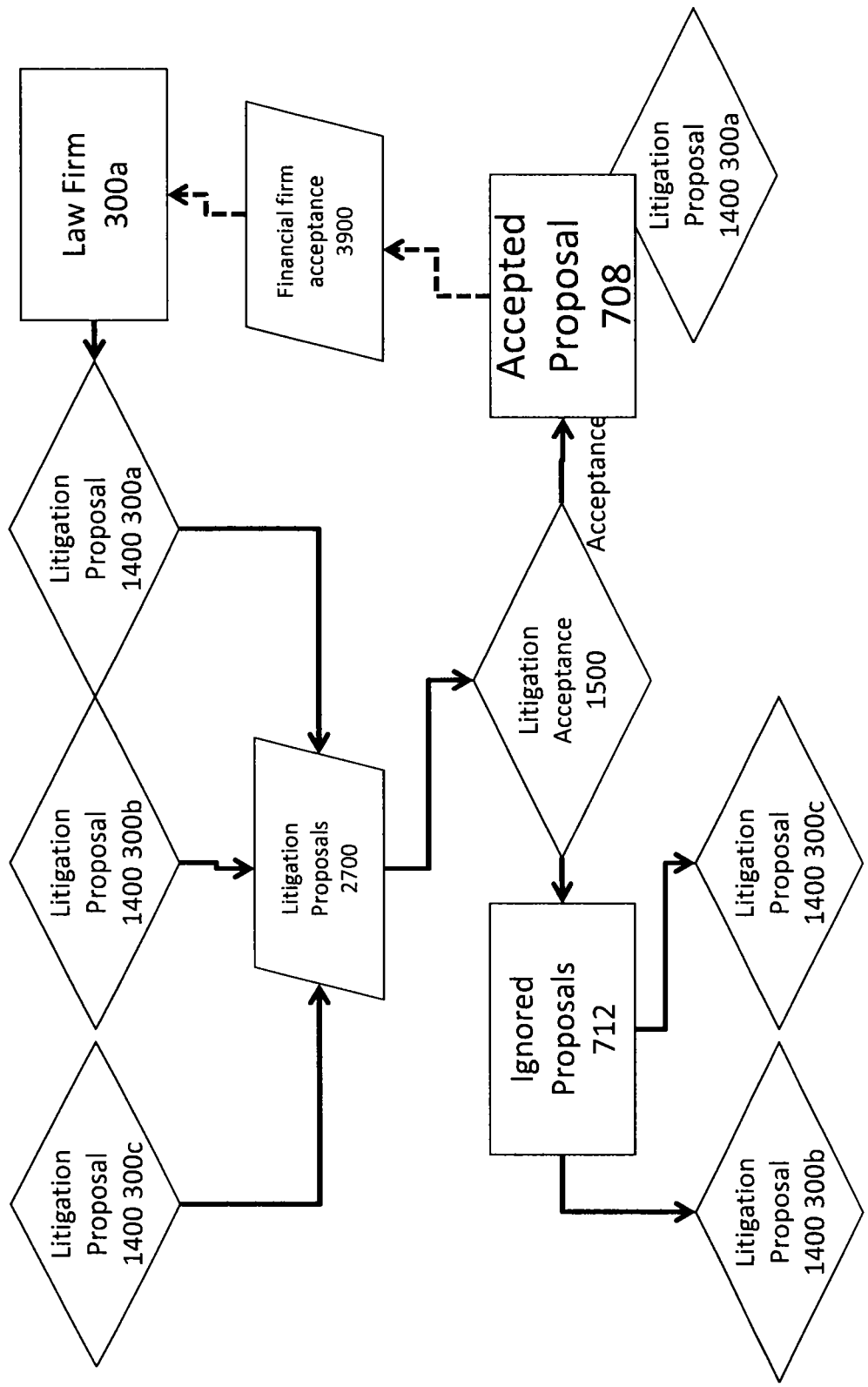
FIG. 16 depicts a schematic diagram of another example of a use case in which a financial firm engages a single law firm by accepting a litigation proposal.

FIG. 16 shows another example of a use case in which a financial firm engages a single law firm by accepting a litigation proposal. Law firms 300*a*, 300*b*, and 300*c* submit litigation proposals 1400. Financial firm 200*a* accepts proposal 708 of law firm 300*a* through a litigation acceptance process 1500 thereby establishing an attorney client relationship. Other litigation proposals from firms 300*b*, and 300*c* are ignored 712 and/or discarded.

Figure 17:
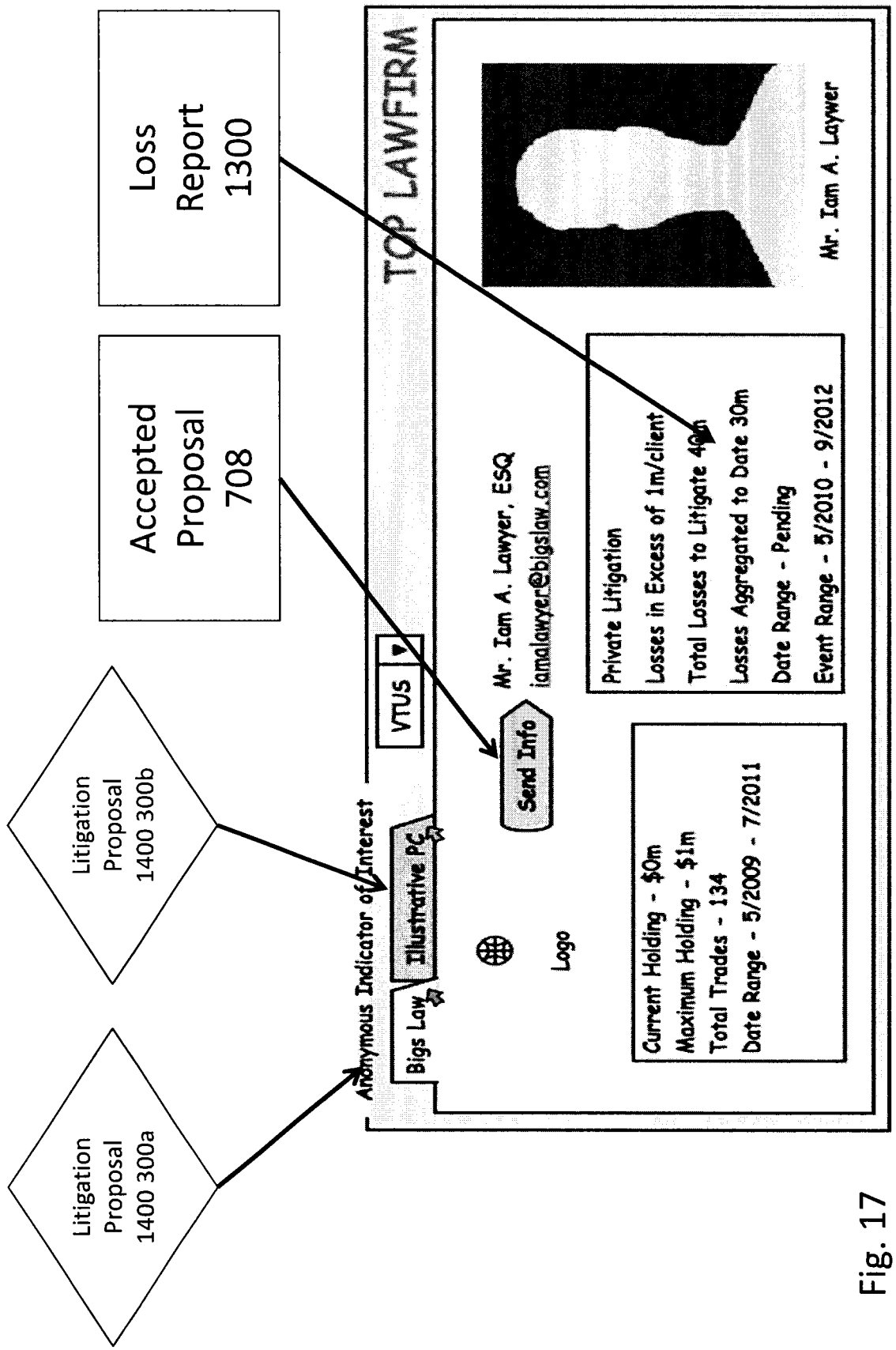
FIG. 17 depicts a schematic diagram and graphical interface depiction of the use case of FIG. 16 in which a financial firm has the option to accept a single proposal from two competing proposals.

FIG. 17 shows a graphical interface depiction of the use case of FIG. 16 in which a financial firm has the option to accept a single proposal from two competing proposals. The interface has a "send info" button corresponding to accepted proposal 708 to accomplish the same.

Figure 18:
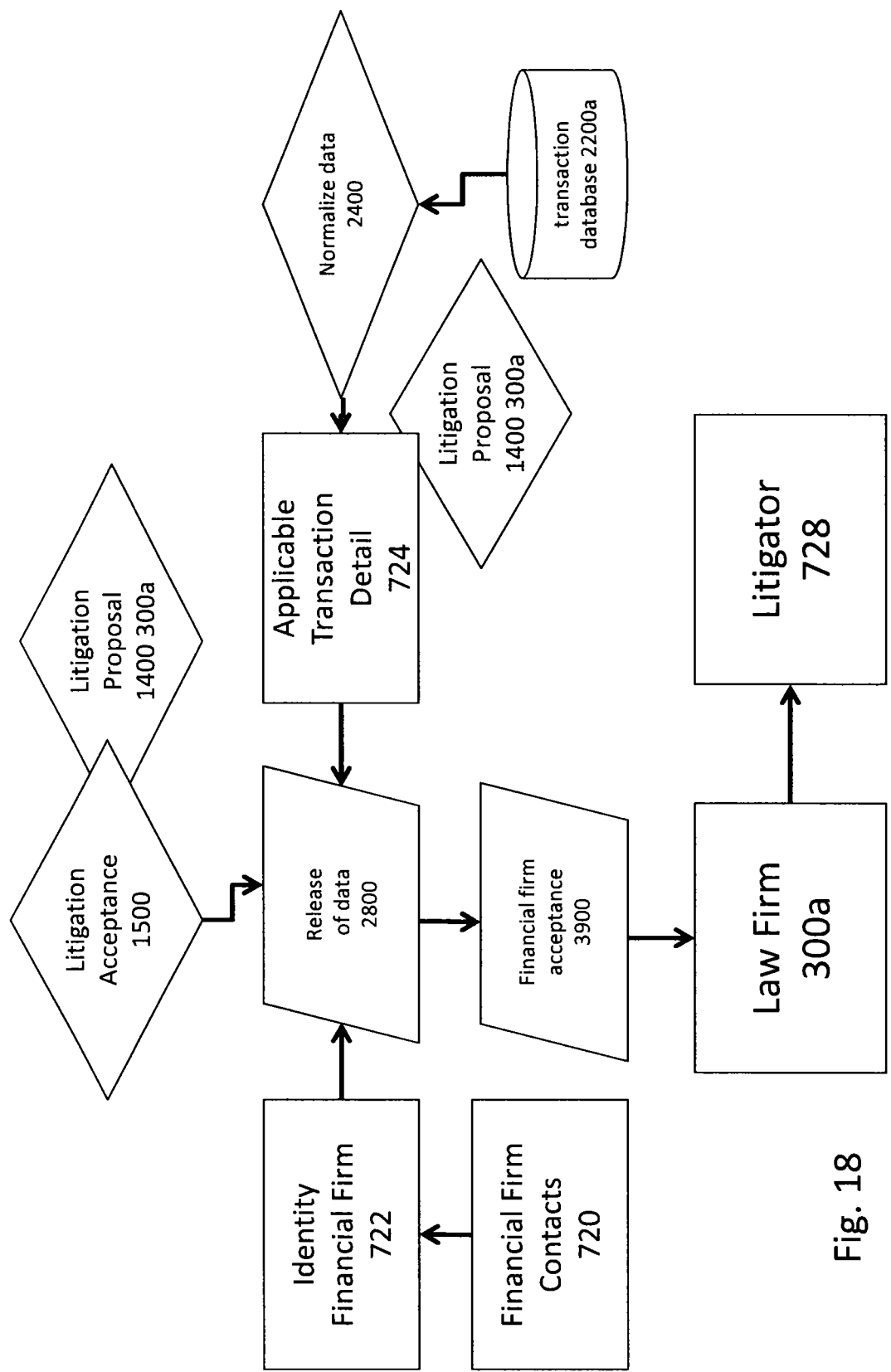
FIG. 18 depicts a schematic diagram of another example of a use case in which a financial firm discloses its identity while releasing portfolio transaction data.

FIG. 18 shows another example of a use case in which a financial firm discloses its identity while releasing portfolio transaction data to a law firm. Data to be released to selected law firm 300*a* include the identity of the financial firm 722, contacts within the financial firm 720, and portfolio transaction data and details 724 that conform to the restricted and narrow specifications outlined within the accepted litigation proposal 1400 from law firm 300*a* including security identifier and date range. Data is finally released to firm 300*a* and litigator 728 of firm 300*a*.

Figure 19:
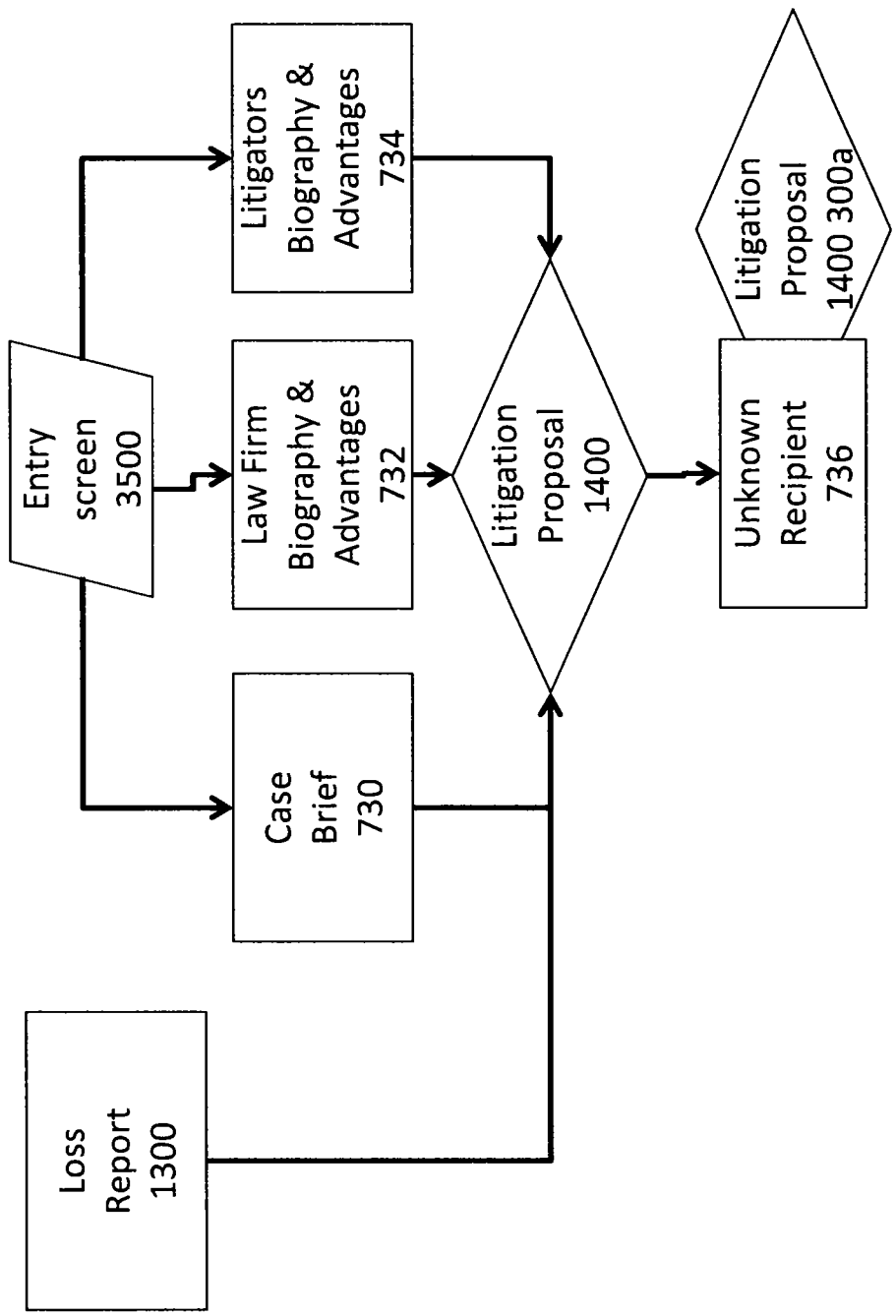
FIG. 19 depicts a schematic diagram of another example of a use case in which a law firm submits litigation proposals tailored to a loss report.

FIG. 19 shows another example of a use case in which a law firm submits litigation proposals tailored to a loss report. Law firm 300*a* conveys litigation proposal 1400 to an unknown recipient being aware only of the loss amounts that have been experienced based on loss reports dependent on security identifier, date range, and accounting method. The graphical entry interface 3500 allowing the law firm-litigator to combine a case brief 730, biographies 732 and 734, and loss metrics from report 1300 into a single presentation 1400 to an unknown recipient 736 that experienced losses matched to the specifications within litigation proposal 1400.

Figure 20:
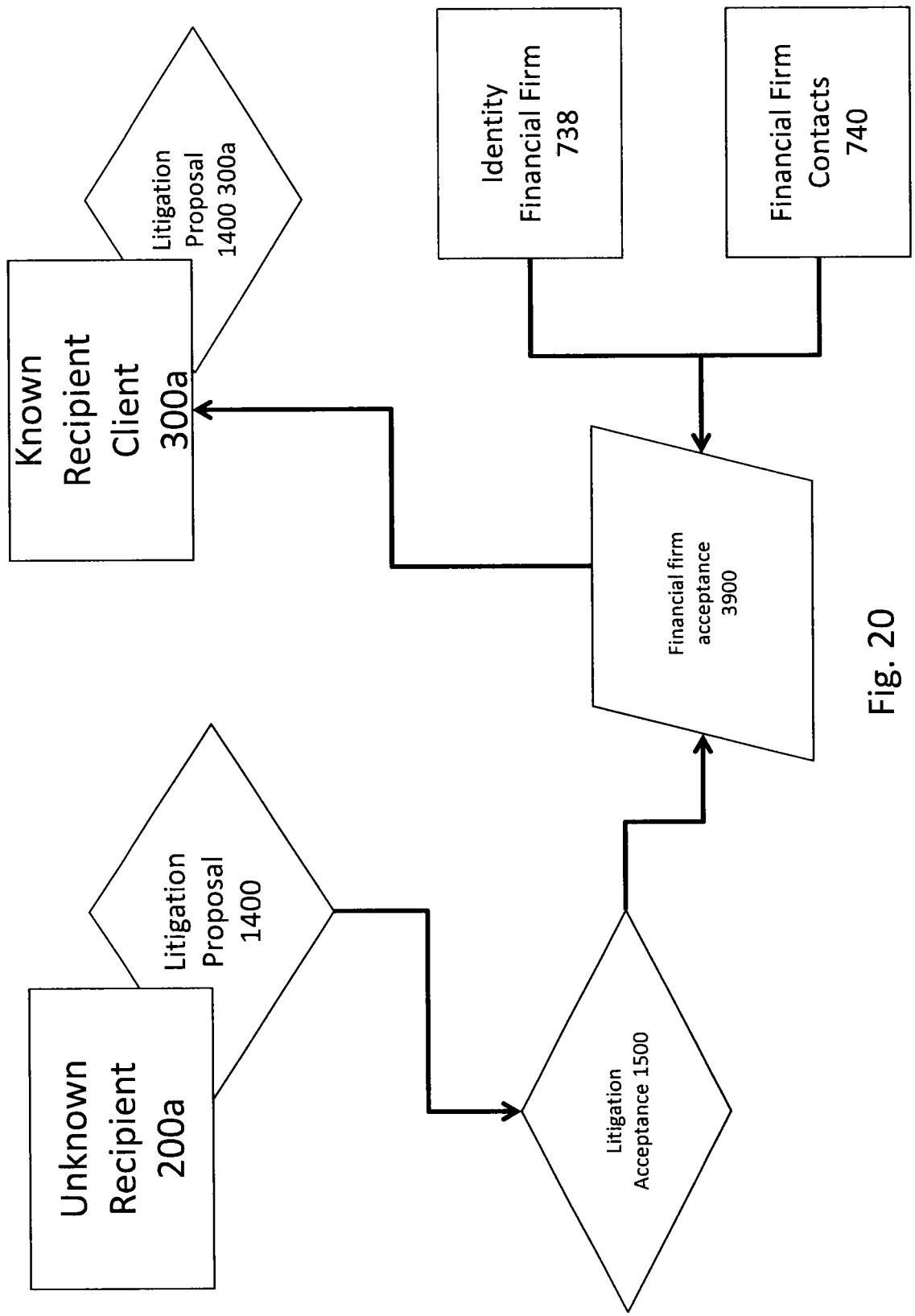
FIG. 20 depicts a schematic diagram of another example of a use case in which a law firm has been engaged by a financial firm having now disclosed its identity.

FIG. 20 shows another example of a use case in which a law firm 300*a* has been engaged by unknown financial firm 200*a* having now disclosed its identity. Upon acceptance of litigation proposal 1400, financial firm 200*a* information regarding identity 738 and contacts 740 is released to law firm 300*a*. The release contains other information as necessary to begin litigation on behalf of financial firm 200*a* including the proving of losses.

Figure 21:
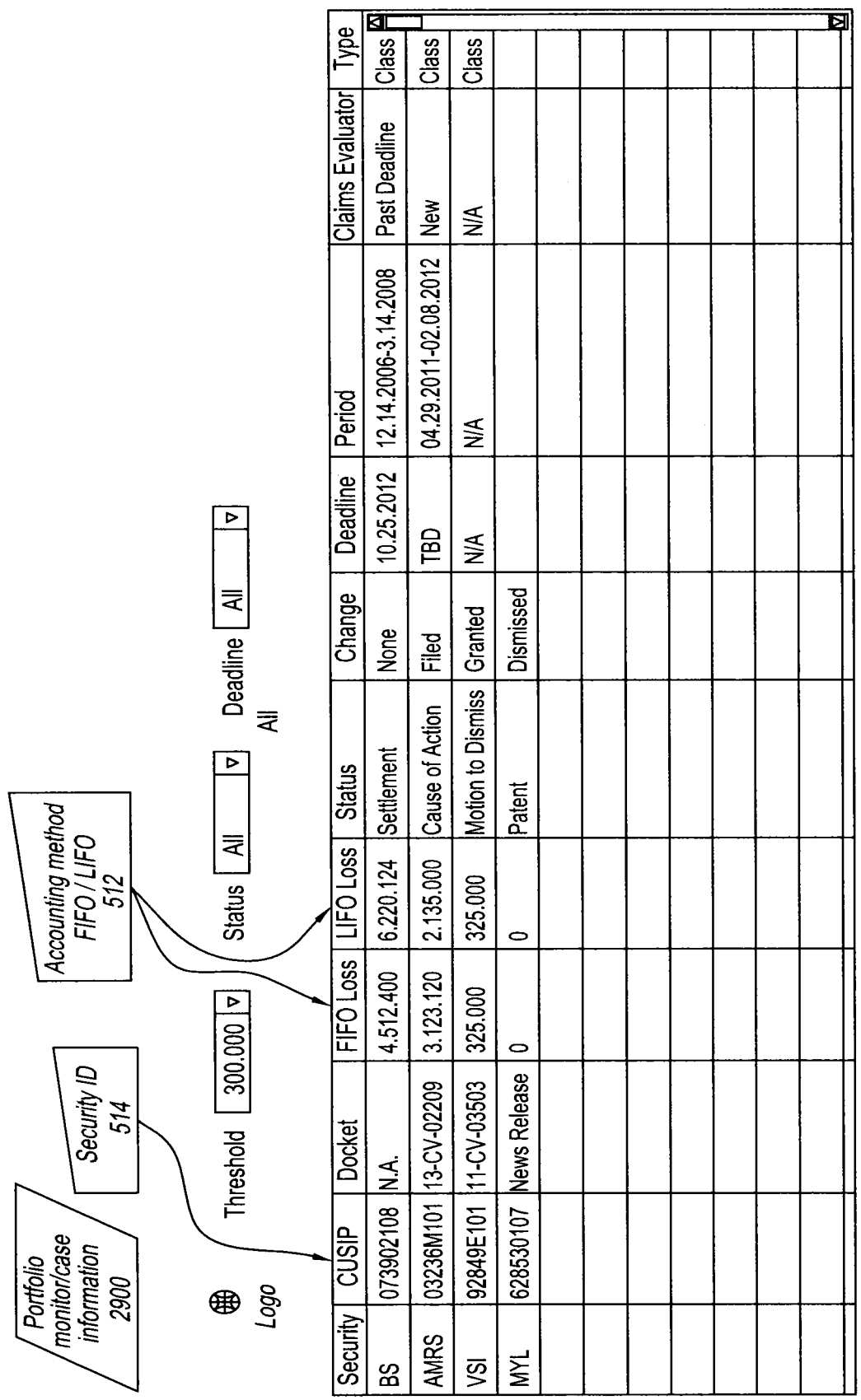
FIG. 21 depicts a graphical interface depiction of a detailed portfolio monitoring summary.

FIG. 21 shows a graphical interface depiction 750 of a detailed portfolio monitoring summary. A list of a financial institution's securities is shown that has been identified by the system to match legal activity. Details are displayed in columns for each security. A ticker symbol or description of security as well as security identifier (CUSIP) 514 is listed. The legal activity/Docket column list reference links to subject matter. Here a court docket or event reference may be listed. Loss calculations are displayed. In this example both FIFO and LIFO accounting method 512 loss calculations is performed and loss numbers are shown in individual columns 512. Status of the legal activity, latest change, deadline of action, Time period of litigation and Litigation Type is also shown for each security. Inputs is available on top of the list to sort and filter down the list in various ways.

FIG. 22 shows a graphical interface depiction 752 of a portfolio monitoring summary that illustrates how a financial firm could obtain a concise view of litigation relevant to its portfolio as part of the 2900 Portfolio monitoring user interface. A list of cases is displayed in a short summary format with color indicators on the right column. This serves as a overview for a financial institution to see where action may be needed. Color indication display red for critical issues yellow for less critical issues and green for cases where no action is needed. On this screen you can select a case listed and select Litigation parade 2700 (FIG. 17) or portfolio analysis via the two buttons on top of the screen.

Figure 23:
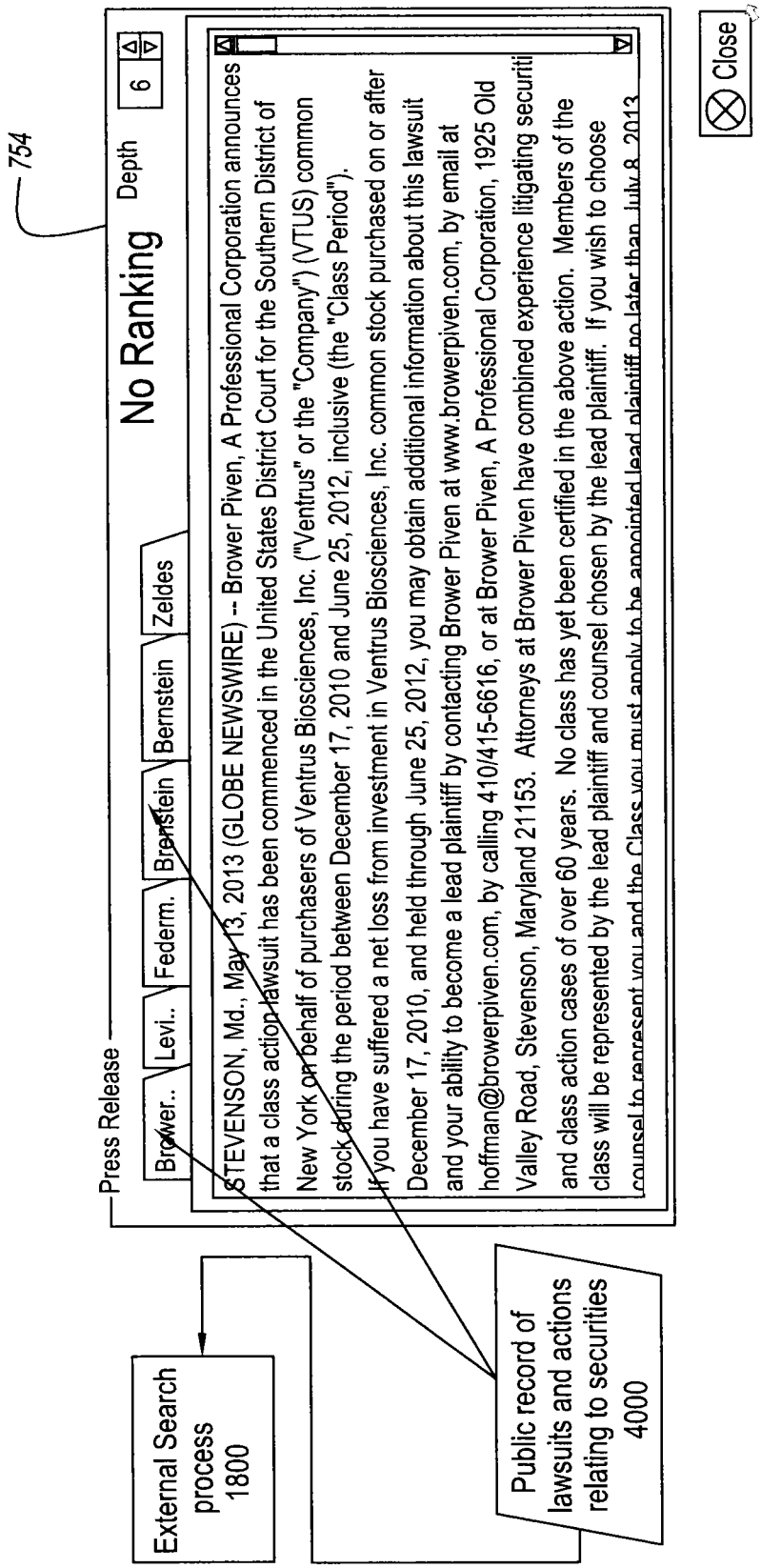
FIG. 23 depicts a schematic diagram and graphical interface depiction listing the results of an external search process.

FIG. 23 shows a graphical interface depiction 754 listing the results of an external search process based on the identification of press releases from publically available sources on the internet.

Figure 24:
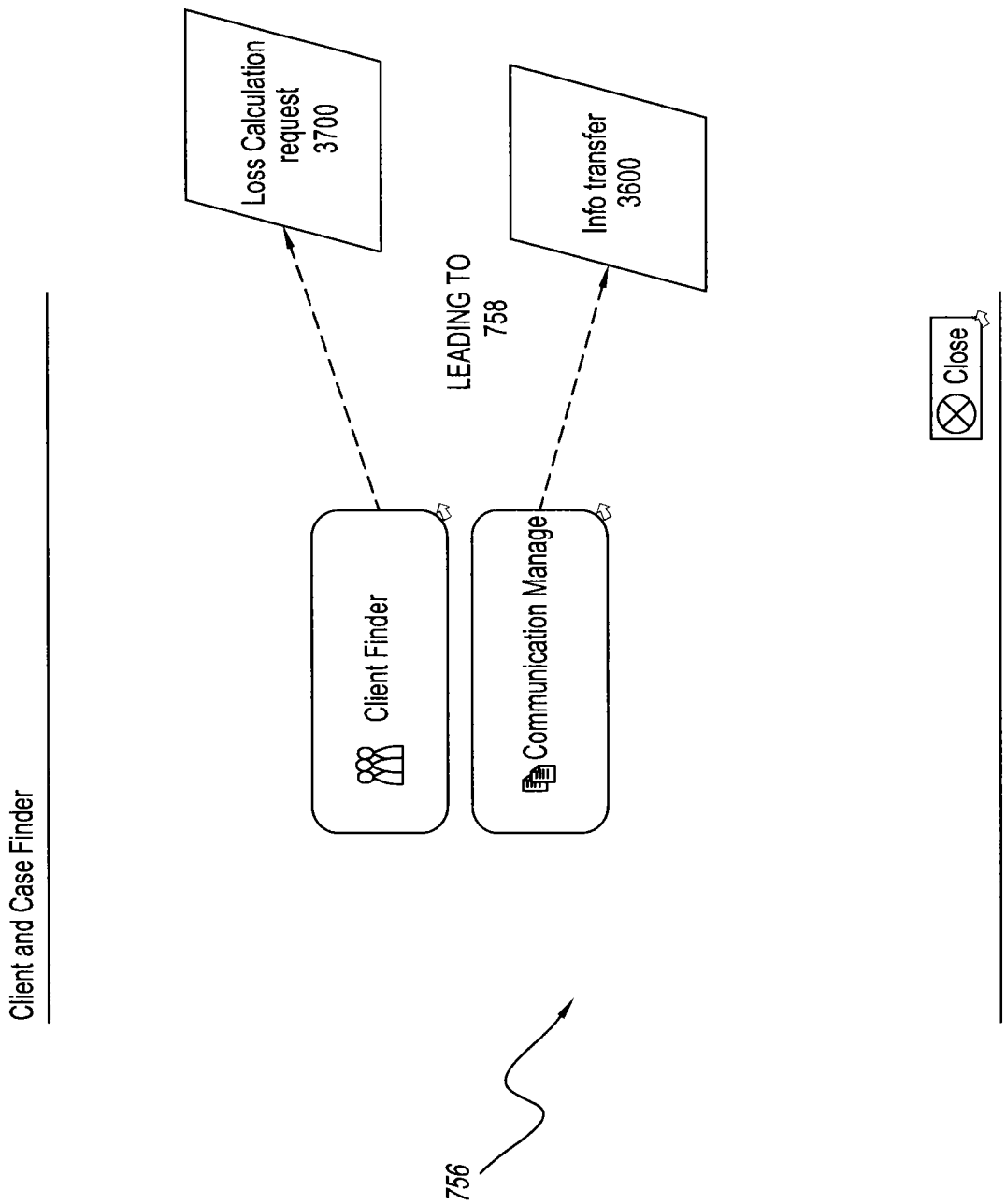
FIG. 24 depicts a schematic diagram and graphical interface depiction illustrating a programming fork to loss calculation requests or information transfer.

FIG. 24 shows a graphical interface depiction 756 illustrating a user interface for the Law firm. A set of buttons give the user a choice 758 to proceed to loss calculation requests 3700 or information transfer 3600.

Figure 25:
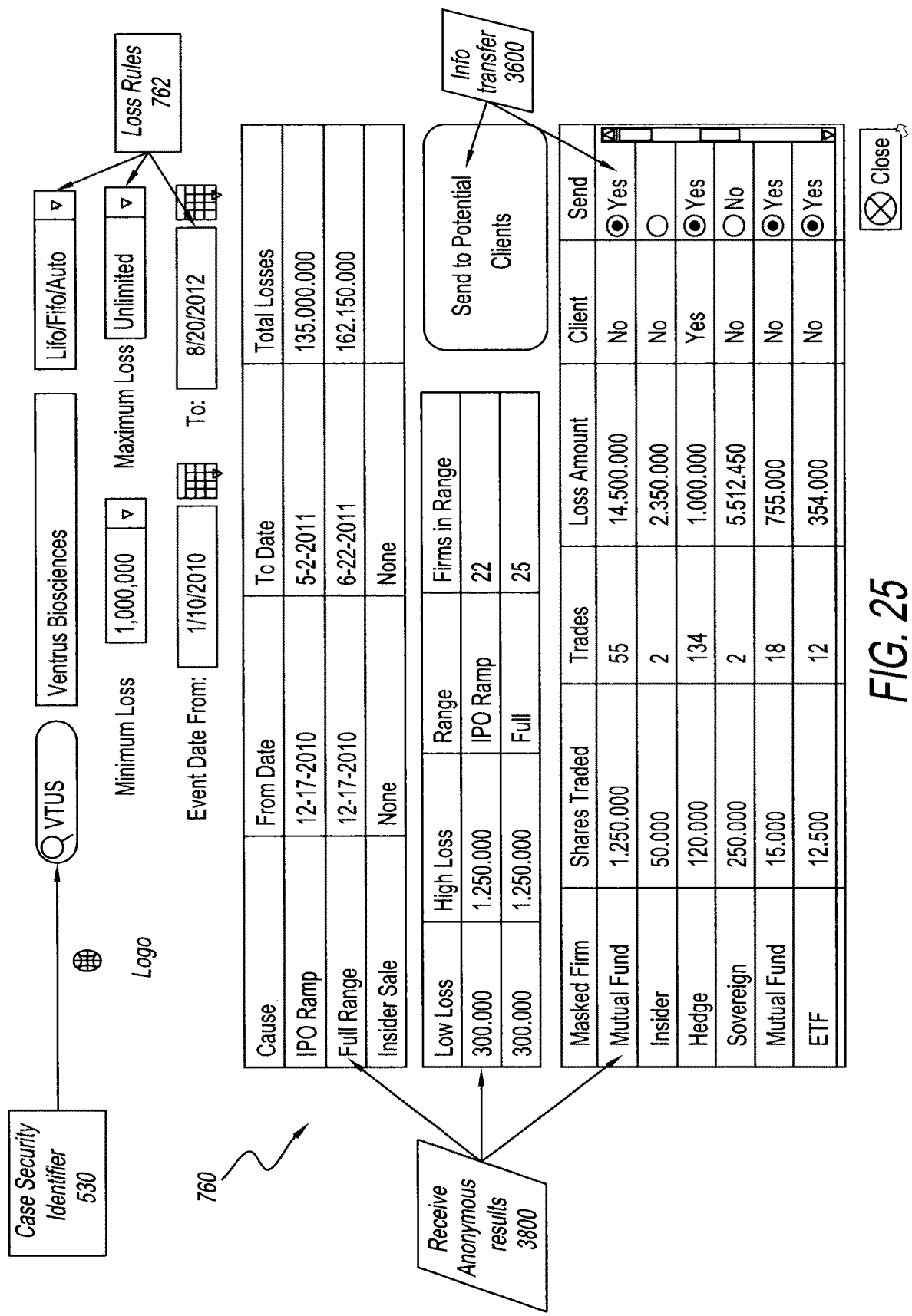
FIG. 25 depicts a schematic diagram and graphical interface depiction of a law firm receiving anonymous results based on adjustable loss rules.

FIG. 25 shows a graphical interface depiction 760 of a law firm receiving anonymous results based on adjustable loss rules. Depiction 760 is an extension of the logical requirements set forth in FIG. 2. Loss rules 762, such as minimum/maximum loss and date range, determine the parameters and bounds of the search. A case security identifier 530 is inputted by the law firm.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

What is claimed is:

1. A method for machine-controlled legal portfolio monitoring over a monitoring network, comprising:
   receiving, by a computer-based central machine connected to the monitoring network, a loss-calculation request for at least one security of interest, wherein the loss-calculation request is received from a request interface of a computer of at least one legal services provider;
   forwarding the loss-calculation request from the computer-based central machine to a first loss-calculation process block of a computer of a first financial services firm and to a second loss-calculation process block of a computer of a second financial services firm;
   calculating, by each of the first and second loss-calculation process blocks, losses on the security of interest by:
   a) utilizing a transactional data application programming interface (API) to search transactional data in a corresponding transactional database located at one of the first and second financial services firms to obtain securities transactional data of the at least one security of interest; and
   b) processing the securities transactional data of the at least one security of interest to calculate losses attributable to the at least one security of interest at each of the first and second financial services firms;
   wherein the first and second loss-calculation process blocks each utilize an intermediary process block to normalize the transactional data in the transactional databases to a normalized format utilized by the computer-based central machine;
   receiving from the first and second loss-calculation process blocks, by the computer-based central machine, the calculated losses attributable to the at least one security of interest at each of the first and second financial services firms;
   aggregating, by the computer-based central machine, the calculated losses received from the first and second loss-calculation process blocks;
   anonymizing, by the computer-based central machine, the identities of the first and second financial services firms associated with the calculated losses, by applying a proxy mask;
   transmitting, by the computer-based central machine, a loss report comprising the aggregated sum of the calculated losses and the anonymized identities of the first and second financial services firms to a receiving interface of the computer of the at least one legal services provider to enable the at least one legal services provider to view the calculated losses without revealing the identities of the first and second financial firms;
   transmitting, via a litigation proposal management block of the computer-based central machine, at least one security litigation proposal from the at least one legal services provider to at least one of the first and second financial services firms that have incurred losses; and
   transmitting to the at least one legal services provider, via a litigation acceptance management block of the computer-based central machine, a response generated by the at least one of the first and second financial services firms in response to the at least one security litigation proposal.

2. The method of claim 1, wherein the loss report comprises the calculated losses at each one of the first and second financial services firms to enable the at least one legal services provider to view the individual calculated losses at each one of the first and second financial services firms.

3. A system for machine-controlled legal portfolio monitoring over a monitoring network, comprising:
   a computer-based central machine connected to the monitoring network and having a loss-calculation-request interface configured to receive a loss-calculation request for at least one security of interest, wherein the loss-calculation request is received from a request interface of a computer of at least one legal services provider;
   wherein the loss-calculation-request interface of the computer-based central machine is configured to forward the loss-calculation request to a first loss-calculation process block of a computer of a first financial services firm and to a second loss-calculation process block of a computer of a second financial services firm;
   wherein the first and second loss-calculation process blocks are each configured to calculate losses on the security of interest by:
   a) utilizing a transactional data application programming interface (API) to search transactional data in a corresponding transactional database located at one of the first and second financial services firms to obtain securities transactional data of the at least one security of interest; and
   b) processing the securities transactional data of the at least one security of interest to calculate losses attributable to the at least one security of interest at each of the first and second financial services firms;
   wherein the first and second loss-calculation process blocks each utilize an intermediary process block to normalize the transactional data in the transactional databases to a normalized format utilized by the computer-based central machine;
   wherein the computer-based central machine comprises a loss-results receiving interface configured to receive from the first and second loss-calculation process blocks the calculated losses attributable to the at least one security of interest at each of the first and second financial services firms;
   wherein the computer-based central machine comprises a loss-results aggregating block configured to aggregate the calculated losses received from the first and second loss-calculation process blocks;
   wherein the computer-based central machine is configured to anonymize the identities of the first and second financial services firms associated with the calculated losses by applying a proxy mask;
   wherein the computer-based central machine comprises a loss-report transmitting interface configured to transmit a loss report comprising the aggregated sum of the calculated losses and the anonymized identities of the first and second financial services firms to a receiving interface of the computer of the at least one legal services provider to enable the at least one legal services provider to view the calculated losses without revealing the identities of the first and second financial firms;

wherein the computer-based central machine comprises a litigation-proposal management block configured to transmit at least one security litigation proposal received from the at least one legal services provider to at least one of the first and second financial services firms that have incurred losses; and wherein the computer-based central machine comprises a litigation acceptance management block configured to transmit to the at least one legal services provider a response generated by the at least one of the first and second financial services firms in response to the at least one security litigation proposal.

* * * * *